United States Patent
Ratnakaram et al.

(10) Patent No.: US 12,190,368 B2
(45) Date of Patent: Jan. 7, 2025

(54) MULTI-COMPUTER SYSTEM FOR OPTIMIZED QUEUE MANAGEMENT BASED ON FACIAL RECOGNITION

(71) Applicant: Bank of America Corporation, Charlotte, NC (US)

(72) Inventors: Udaya Kumar Raju Ratnakaram, Telangana (IN); Bhagya Lakshmi Sudha Lavanya Mallidi, Hyderabad (IN); Puneetha Polasa, Telangana (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 219 days.

(21) Appl. No.: 17/702,991

(22) Filed: Mar. 24, 2022

(65) Prior Publication Data
US 2023/0306496 A1    Sep. 28, 2023

(51) Int. Cl.
G06Q 30/00      (2023.01)
G06Q 30/0601    (2023.01)
G06V 40/16      (2022.01)

(52) U.S. Cl.
CPC ....... *G06Q 30/0633* (2013.01); *G06V 40/172* (2022.01)

(58) Field of Classification Search
CPC .......... G06Q 30/0601; G06Q 30/0613; G06Q 30/0623; G06Q 30/0629; G06Q 30/0631
See application file for complete search history.

(56) References Cited

U.S. PATENT DOCUMENTS 7,987,188 B2 *  7/2011  Neylon ................ G06F 16/313
                                                    706/45
8,386,336 B1 *  2/2013  Fox .................... G06Q 30/0631
                                                    705/26.7
8,417,713 B1 *  4/2013  Blair-Goldensohn ......................
                                                G06F 16/9535
                                                    705/347

(Continued)

OTHER PUBLICATIONS

Rajvanshi, Aseem, and Dhanya Pramod. "Queue time estimation in checkout counters using computer vision and deep neural network." Journal of Physics: Conference Series. vol. 1964. No. 6. IOP Publishing, 2021. (Year: 2021).*

(Continued)

*Primary Examiner* — Christopher B Seibert
(74) *Attorney, Agent, or Firm* — Banner & Witcoff, Ltd.

(57) ABSTRACT

Arrangements for smart tracking and queue management are provided. In some aspects, in response to detecting a user at an entity location, image data may be captured of the user. The image data may be analyzed using one or more facial recognition techniques to determine whether the user is a recognized user. In some examples, a user or user device may be connected to an entity computing device associated with a shopping cart or other device for capturing items for purchase. The user may gather items for purchase and purchase item data may be transmitted for analysis. In some examples, a request to checkout may be received and, in response, real-time queue data may be requested. The real-time queue data may be analyzed using a machine learning model to determine an optimal queue for the user. A notification identifying the queue may be transmitted to the entity computing device.

21 Claims, 16 Drawing Sheets

(56) References Cited

U.S. PATENT DOCUMENTS

| | | | |
|---|---|---|---|
| 8,615,420 | B2 | 12/2013 | Holliday |
| 9,524,518 | B1* | 12/2016 | Singer .................. G06Q 30/0603 |
| 9,633,319 | B2 | 4/2017 | Monk |
| 10,235,513 | B2* | 3/2019 | Martinez Dde Velasco Cortina .................. G07C 9/257 |
| 11,004,290 | B2 | 5/2021 | Schwartz et al. |
| 12,045,822 | B2* | 7/2024 | Ratnakaram ........... G06Q 20/20 |
| 2001/0021914 | A1* | 9/2001 | Jacobi .................... G06Q 30/02 705/26.1 |
| 2005/0162670 | A1* | 7/2005 | Shuler, Jr. .......... H04N 1/00408 358/1.2 |
| 2007/0046675 | A1* | 3/2007 | Iguchi ................... G06T 11/206 345/441 |
| 2009/0110089 | A1* | 4/2009 | Green .................. H04L 5/0037 370/329 |
| 2009/0125371 | A1* | 5/2009 | Neylon ................. G06F 16/313 707/739 |
| 2010/0268661 | A1* | 10/2010 | Levy ...................... G06Q 30/02 705/347 |
| 2011/0257985 | A1* | 10/2011 | Goldstein ........... G06F 16/3334 707/812 |
| 2014/0195931 | A1* | 7/2014 | Kwon .................... G06Q 30/02 715/753 |
| 2014/0351079 | A1* | 11/2014 | Dong .................. G06Q 30/0282 705/26.7 |
| 2015/0332258 | A1* | 11/2015 | Kurabi ............... G06Q 20/4015 705/71 |
| 2015/0379732 | A1* | 12/2015 | Sayre, III .............. G06T 11/001 382/164 |
| 2016/0140564 | A1* | 5/2016 | Einhorn ............... G06Q 20/085 705/44 |
| 2017/0193997 | A1* | 7/2017 | Chen ................... G10L 15/1815 |
| 2018/0293573 | A1* | 10/2018 | Ortiz .................... G06Q 20/102 |
| 2019/0114645 | A1* | 4/2019 | Gaitanos ............ G06Q 20/4012 |
| 2020/0151636 | A1 | 5/2020 | Elliot et al. |
| 2021/0019528 | A1* | 1/2021 | Ghadyali ............. G06F 11/3409 |
| 2021/0073768 | A1* | 3/2021 | Gordon ................ G06Q 20/202 |
| 2022/0067689 | A1* | 3/2022 | Guack .................... G06T 7/251 |
| 2023/0162552 | A1* | 5/2023 | Bass ........................ G07C 9/27 705/5 |

OTHER PUBLICATIONS

Peschel, Anne Odile. Essays on implicit information processing at the point of sale: Evidence from experiments and scanner data analysis. Institut for Økonomi, Aarhus Universitet, 2016. (Year: 2016).*

* cited by examiner

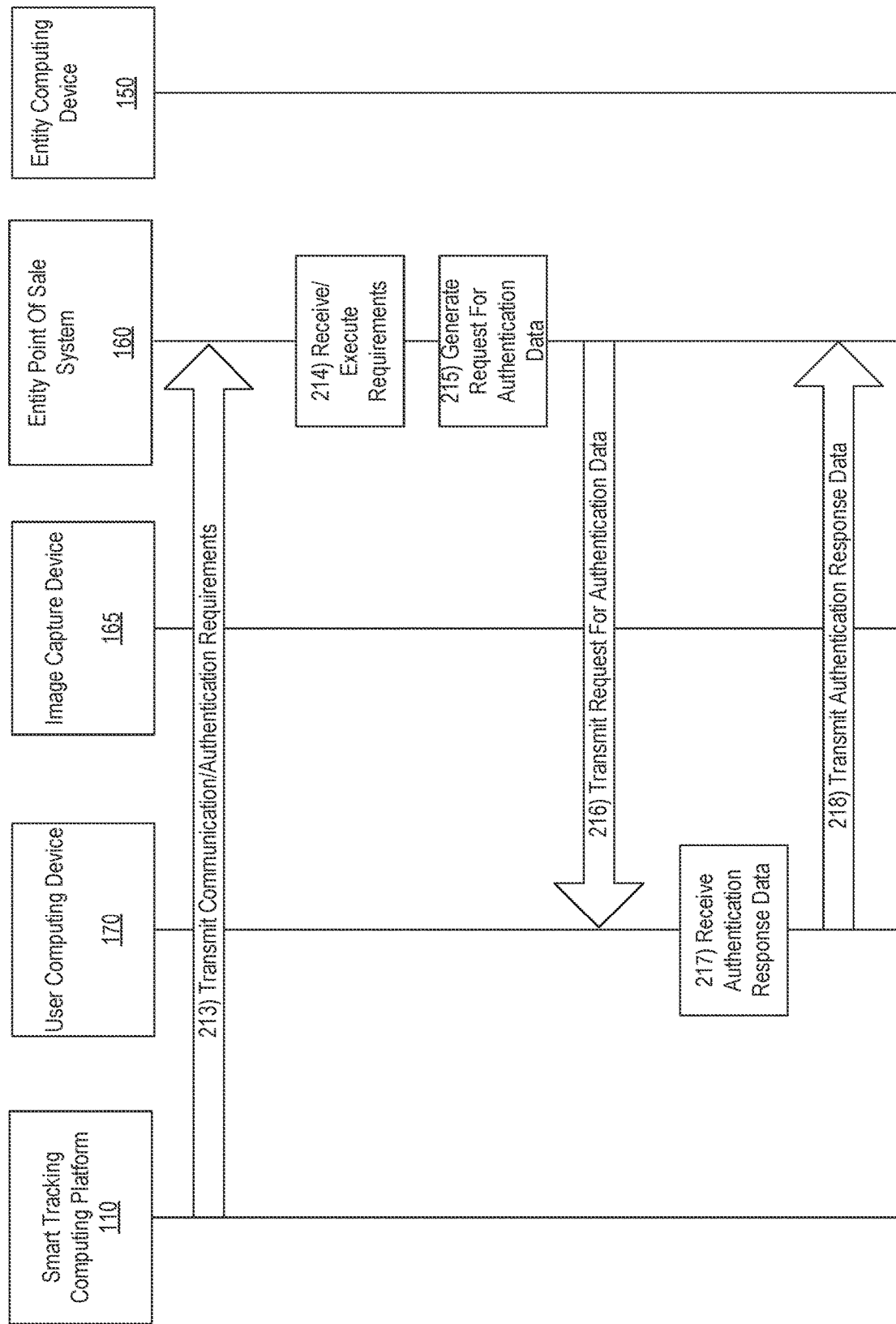

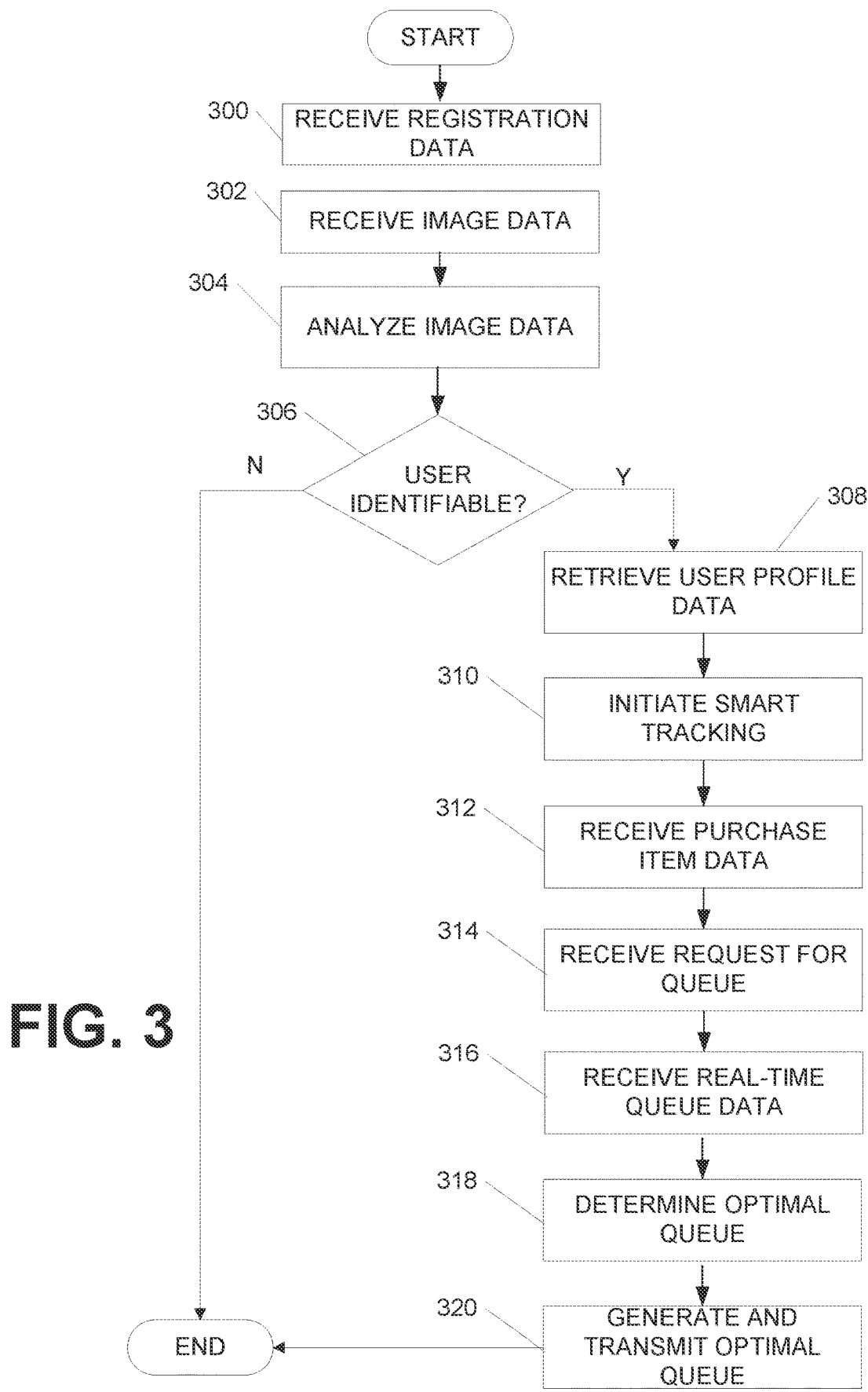

MULTI-COMPUTER SYSTEM FOR OPTIMIZED QUEUE MANAGEMENT BASED ON FACIAL RECOGNITION

BACKGROUND

Aspects of the disclosure relate to electrical computers, systems, and devices for dynamic authentication and queue management based on facial recognition data.

People are often looking to streamline necessary tasks and spend less time on things like errands. Accordingly, while errands such as grocery shopping may be a necessary part of life for many, conventional arrangements for shopping, checkout, and the like, are inefficient, rely on inaccurate data or are essentially just manual processes. Accordingly, arrangements discussed herein rely on facial recognition to identify a customer, perform smart tracking operations as the user moves through a location, execute dynamic authentication processes, and generate a recommended optimal queue based on real-time data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with efficiently and quickly capturing customer purchases and processing user transactions.

In some aspects, a user may be detected at an entity location. For instance, a user computing device may detect a signal emitted by a location beacon at the entity location. Responsive to detecting the user, image data may be captured of the user. The image data may be analyzed using one or more facial recognition techniques to determine whether the user is a recognized user. If so, smart tracking and optimal queue functions may be initiated.

In some examples, a user or user device may be connected to an entity computing device associated with a shopping cart or other device for capturing items for purchase. The user may gather items for purchase and purchase item data may be transmitted for analysis. In some examples, a user may request checkout (e.g., via an interface on the entity computing device). In response to receiving the request to checkout, real-time queue data may be requested. The real-time queue data may include image data, weight data, and the like. The real-time queue data may be analyzed using a machine learning model to determine an optimal or recommended queue for the user. The user may then proceed to the queue and, location data may be used to gather checkout data such as whether the user accepted the recommended queue, amount of time to checkout, number of items processed, and the like. This information may be used to update and/or validate the machine learning model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for implementing smart tracking, dynamic authentication and queue management functions in accordance with one or more aspects described herein;

FIG. 3 illustrates an illustrative method for implementing smart tracking and queue management functions according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, various day-to-day functions and errands can be time consuming and inefficient. For instance, tasks such as grocery shopping are often inefficient because the checkout process can be cumbersome. Accordingly, aspects described herein provide smart tracking, dynamic authentication and queue management functions to improve the process.

For instance, a user may be detected upon entering an entity location. An image of the user may be captured and facial recognition analysis may be performed to determine whether the user is a recognized user. If so, a user profile may be retrieved.

In some examples, detecting the user may include detecting a user computing device and connecting an entity point-of-sale system to the user computing device. The type of connection between the devices may be identified and used to determine authentication requirements.

The user may be associated with an entity computing device that may be connected to, for instance, a shopping cart or other device for capturing goods for purchase. The purchase item data may be captured and transmitted to the computing platform for processing.

Upon receiving a request to checkout (e.g., via the entity computing device), real-time queue data may be requested and received. The real-time queue data, as well as location of the entity computing device associated with the user and purchase item data may be used as inputs in a machine learning model. The machine learning model may analyze the data and identify and optimal queue for the user. The optimal queue may be transmitted to the user and displayed on the entity computing device associated with the user, on a user computing device, or the like.

These and various other arrangements will be discussed more fully below.

Figure 1A:
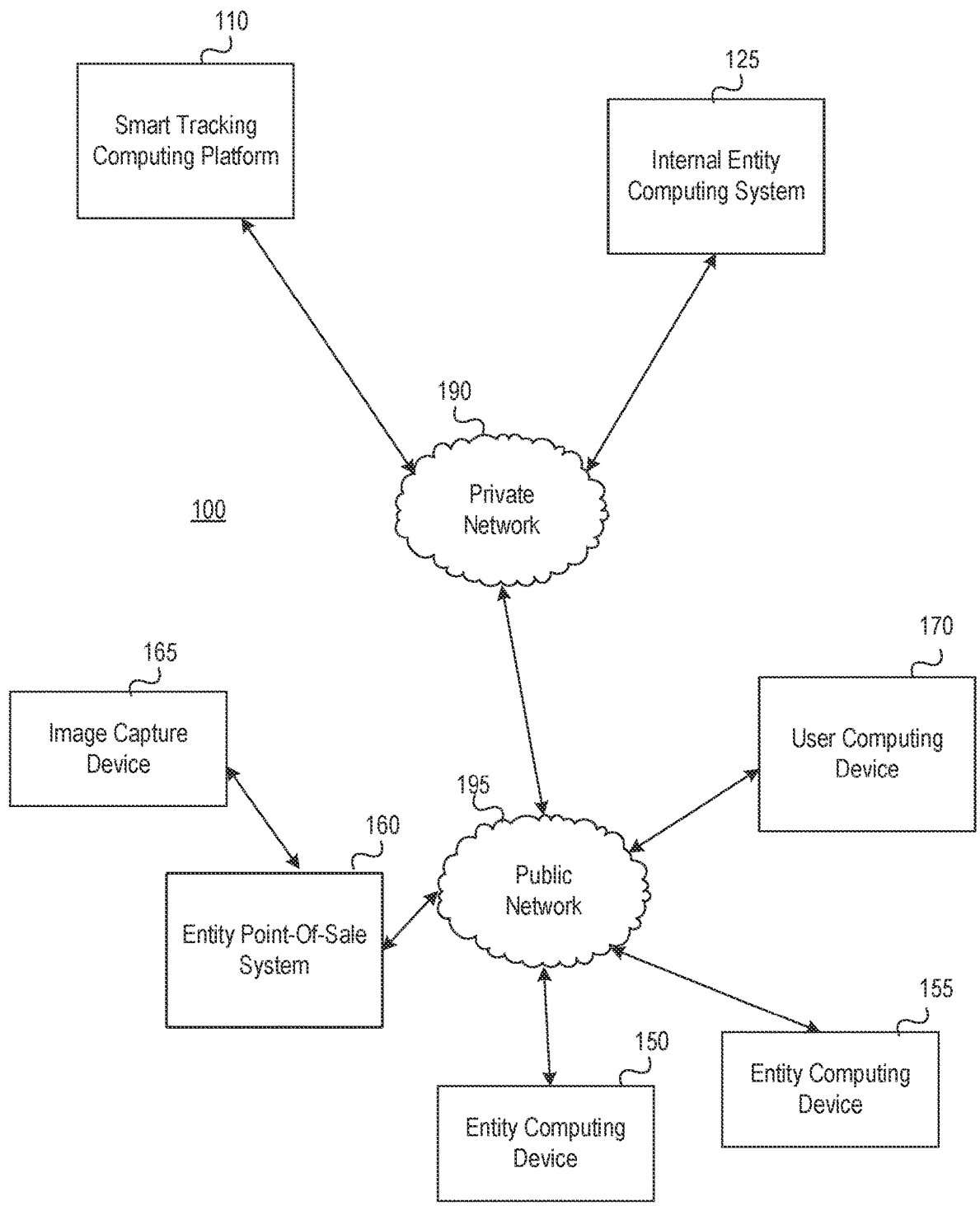
FIGS. 1A and 1B depict an illustrative computing environment for implementing smart tracking, dynamic authentication and queue management functions in accordance with one or more aspects described herein.
Figure 1B:
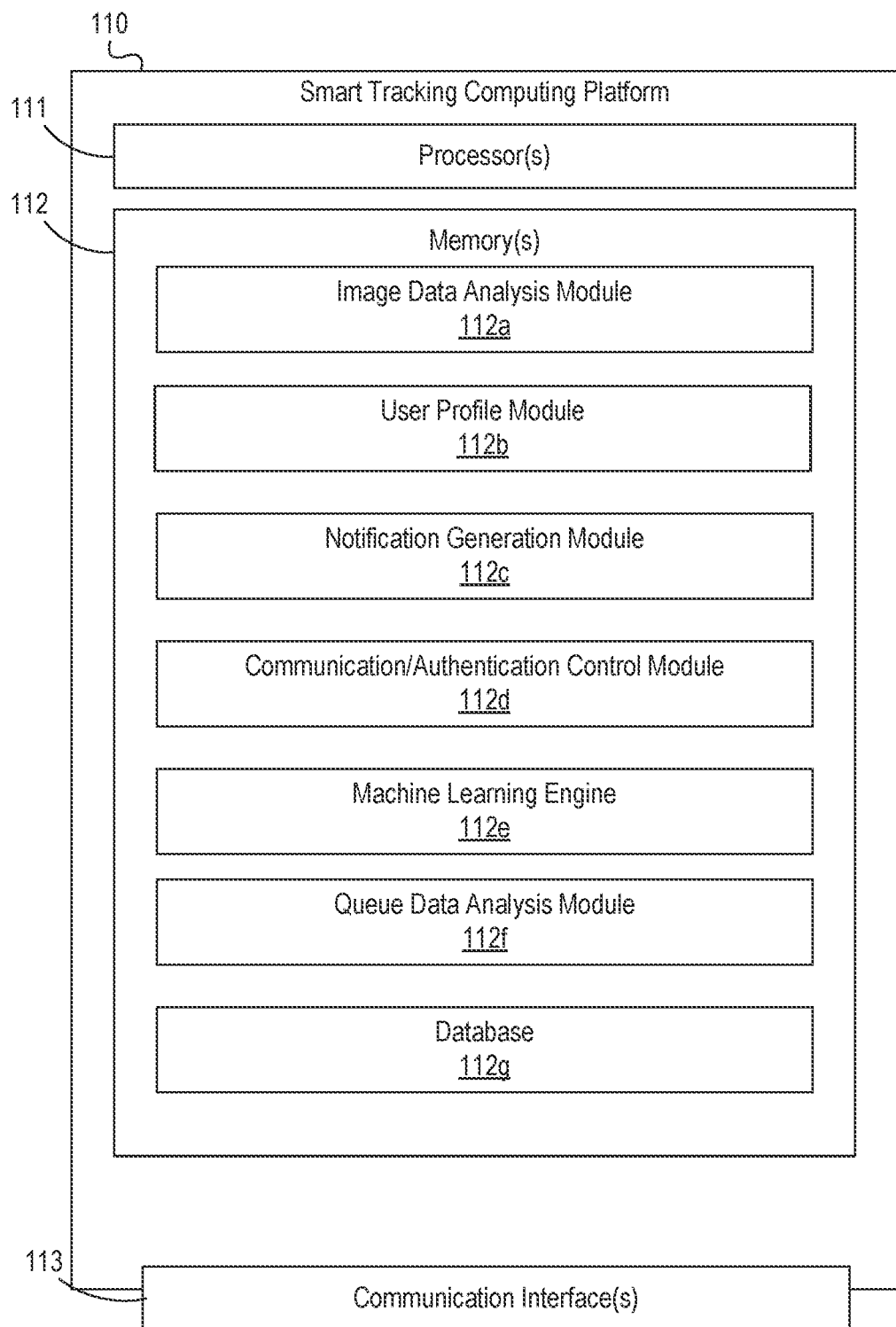

FIGS. 1A-1B depict an illustrative computing environment for implementing and using facial recognition for smart tracking and queue management in accordance with one or more aspects described herein. Referring to FIG. 1A, computing environment 100 may include one or more computing devices and/or other computing systems. For example, computing environment 100 may include smart tracking computing platform 110, internal entity computing system 125, entity point-of-sale (POS) system 160, image capture device 165, user computing device 170, entity computing device 150, and entity computing device 155. Although one internal entity computing system 125, one POS system 160, one image capture device 165, one user computing device 170 and two entity computing devices 150, 155 are shown, any number of systems or devices may be used without departing from the invention.

Further, while aspects may be described in the context of processes performed by the smart tracking computing platform 110, in some examples, one or more processes or functions described may be performed by the entity POS system 160, by the entity POS system 160 in combination with the smart tracking computing platform 110, or the like. Additionally or alternatively, smart tracking computing platform 110 may be part of (e.g., a single physical device or a connected device) the entity POS system 160 in some examples.

Smart tracking computing platform 110 may be configured to perform intelligent, dynamic and efficient smart tracking and queue optimization or management based on facial recognition. For instance, upon detecting a registered user at a location (e.g., based on location beacons detecting a cell phone signal, based on a POS device detecting a mobile device signal, or the like), smart tracking computing platform 110 may generate an instruction to capture image data. The instruction may be transmitted to the entity POS system 160 at the location and may cause activation of an image capture device 165 associated with the entity POS system 160. The image capture device 165 may capture an image of the user and transmit it (e.g., via the entity POS system 160) to the smart tracking computing platform 110 for analysis.

Smart tracking computing platform 110 may receive the image data and may perform facial recognition analysis to determine whether the user is a recognized user. If so, user profile data may be retrieved. In some examples, the user profile data may include identifying data of the user, contact information, user device data and/or identifiers, as well as payment data (e.g., one or more accounts, debit cards, credit cards, or the like for use in executing or processing transactions).

In some examples, retrieval of the user profile data may initiate one or more smart tracking and optimized queue management features.

In some examples, the user may be authenticated (e.g., via the entity computing device 150 and/or a mobile user device such as user computing device 170). In some arrangements, authentication data required or type of authentication may be based on a type of communication or communication protocol. For instance, the entity POS system 160 may connect to the user computing device 170 upon detecting the device. The type of connection may then dictate the authentication method, type of data, number of factors, or the like, to authenticate the user. In some examples, the type of connection may also dictate data transmission protocols.

In one example, if the entity POS system 160 and/or user computing device 170 are communicating via ultra-wide band, a first type of authentication method or data may be required. If the device is communicating via Bluetooth™ a second type of authentication method or data may be required. Accordingly, the system may identify the type of connection or communication protocol currently in use and identify a type of authentication method or particular types of authentication data required to authenticate the user based on the type of connection. In some examples, the authentication method associated with each type of connection may be user selected and stored in, for instance the user profile. Additionally or alternatively, the authentication requirements may be determined by an enterprise organization or by the smart tracking computing platform 110.

Upon authentication, the user may be associated with an entity computing device, such as entity computing device 150. The entity computing device may, in some examples, be connected to or otherwise associated with an entity device, such as a shopping cart. The entity computing device 150 may provide data to the smart tracking computing platform 110 related to location of the device 150 and user, weight of items in the device, number of items in the device, and the like. The entity computing device 150 may include a display screen that may display one or more user interfaces.

In some examples, a user may request checkout via the display of the entity computing device 150. Accordingly, an instruction may be transmitted to smart tracking computing platform 110 to initiate queue management and optimization functions. For instance, real-time queue data may be received from each active queue at the entity location. The queue data may include image data of a line, image data of items associated with people in line, weight data associated with weight of items being checked out, number of items associated with each user in line, and the like. This data may be analyzed in real-time to identify a recommended queue for the user. The recommended queue may be transmitted to the entity computing device 150 and/or user computing device 170 and displayed by the display.

In some arrangements, location data of the user may be received to determine whether the user accepted the recommended queue. This feedback data may be used to further refine, for instance, machine learning models used to evaluate real-time queue data to generate a recommended queue.

In some examples, based on authentication data received from the user, an automatic payment process may be initiated. Accordingly, the user may pay for purchased items with minimal or no user interaction (e.g., upon expiration of a predetermined time after scanning an item at the queue, upon user input indicating completion of the scanning process, or the like). Payment information may, in some examples, be retrieved from user profile data.

Computing environment 100 may further include internal entity computing system 125. Internal entity computing system 125 may host one or more applications, store user information such as account or payment information, and the like. In some examples, data from internal entity computing system 125 may be retrieved to perform payment processing based on identification of the user from facial recognition.

Computing environment 100 may further include one or more entity computing devices 150, 155. Entity computing devices 150, 155 may be mobile devices that may, in some examples, be connected to or associated with an item at an entity location, such as a shopping cart. The entity computing devices 150, 155 may include a touch screen or other interactive display for displaying notifications to users, receiving user input or response data, and the like.

Computing environment 100 may further include an entity point-of sale (POS) system 160. The entity POS system 160 may be one of a plurality of POS systems 160 each associated with a checkout queue at the entity location. In other examples, the entity location may have a single POS system and a plurality of terminals connected thereto and distributed at various checkout queues at the entity location. The POS system 160 may include one or more image capture devices 165. For instance, an image capture device 165 may be arranged at or near an entrance to the entity location to capture user image data that may then be processed using facial recognition.

Further, image capture devices 165 may be distributed at the checkout queues to capture real-time image data associated with a number of users in a queue, number of items associated with each user, and the like. This data may be analyzed (e.g., using machine learning) to generate a recommended queue for a user.

As mentioned above, computing environment 100 also may include one or more networks, which may interconnect one or more of smart tracking computing platform 110, internal entity computing system 125, entity POS system 160, image capture device 165, entity computing device 150, entity computing device 155, and/or user computing device 170. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, smart tracking computing platform 110 and internal entity computing system 125 may be associated with an enterprise organization (e.g., a financial institution), and private network 190 may be associated with and/or operated by the organization, and may include one or more networks (e.g., LANs, WANs, virtual private networks (VPNs), or the like) that interconnect smart tracking computing platform 110, internal entity computing system 125, and one or more other computing devices and/or computer systems that are used by, operated by, and/or otherwise associated with the organization. Public network 195 may connect private network 190 and/or one or more computing devices connected thereto (e.g., smart tracking computing platform 110, internal entity computing system 125,) with one or more networks and/or computing devices that are not associated with the organization. For example, entity POS system 160, image capture device 165, entity computing device 150, entity computing device 155, and/or user computing device 170, might not be associated with an organization that operates private network 190 (e.g., because entity POS system 160, image capture device 165, entity computing device 150, entity computing device 155, and/or user computing device 170 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect entity POS system 160, image capture device 165, entity computing device 150, entity computing device 155, and/or user computing device 170 to private network 190 and/or one or more computing devices connected thereto (e.g., smart tracking computing platform 110, internal entity computing system 125).

Referring to FIG. 1B, smart tracking computing platform 110 may include one or more processors 111, memory 112, and communication interface 113. A data bus may interconnect processor(s) 111, memory 112, and communication interface 113. Communication interface 113 may be a network interface configured to support communication between smart tracking computing platform 110 and one or more networks (e.g., private network 190, public network, or the like). Memory 112 may include one or more program modules having instructions that when executed by processor(s) 111 cause smart tracking computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of smart tracking computing platform 110 and/or by different computing devices that may form and/or otherwise make up smart tracking computing platform 110.

For example, memory 112 may have, store and/or include image data analysis module 112a. Image data analysis module 112a may store instructions and/or data that may cause or enable the smart tracking computing platform 110 to store a plurality of user images associated with registered users, receive image data from, for instance, image capture device 165 upon detecting a user at an entity location, and execute one or more facial recognition analysis functions on the image data to determine whether the user is a known or recognized user. Facial recognition techniques employing various recognition algorithms may be used. For instance, geometric algorithms may be used that evaluate distinguishing features within an image and/or on a person and compare those features to features of pre-stored images. In another example, photo-metric algorithms may be used to associate values with different aspects of an image and compare those values to one or more templates to eliminate variances. Some example algorithms that may be used may include principal component analysis, linear discriminant analysis, elastic bunch graph matching, hidden Markov model, multilinear subspace learning, and/or dynamic link matching. In some examples, three dimensional recognition and/or thermal cameras may be used.

Smart tracking computing platform 110 may further have, store and/or include user profile module 112b. User profile module 112b may store instructions and/or data that may cause or enable the smart tracking computing platform 110 to store one or more user profiles based on customer registration data, customer visits to one or more entity locations, and the like. The user profile may include name, contact information including phone number associated with a mobile device such as user computing device 170, or the like. In some examples, the user profile may include one or more pre-stored images of the user (e.g., captured during, for instance, a registration process). In some arrangements, a user may provide payment information, such as a debit card, credit card, or the like, that may be used to process the payment or transaction. In some examples, the user profile may further include prestored authentication data (e.g., for comparison to authentication response data to authenticate a user), authentication requirements based on connection type, and the like.

Smart tracking computing platform 110 may further have, store and/or include notification generation module 112c. Notification generation module 112c may store instructions and/or data that may cause or enable the smart tracking computing platform 110 to generate one or more notifications associated with requesting checkout, a recommended or optimal queue, or the like.

Smart tracking computing platform 110 may further have, store and/or include communication/authentication control module 112d. Communication/authentication control module 112d may store instructions and/or data that may cause or enable the smart tracking computing platform 110 to receive information associated with a connection type (e.g., ultra-wideband, Bluetooth, near-field, or the like) and identify one or more authentication requirements, data transmission requirements, or the like. For instance, upon receiving information related to a connection type (e.g., between entity POS system 160 and, for instance, user computing device 170), communication/authentication control module 112d may identify authentication requirements, data transmission requirements, and the like, and may transmit the requirements to the entity POS system 160, user computing device 170, or the like.

Smart tracking computing platform 110 may further have, store and/or include machine learning engine 112e. Machine learning engine 112e may store instructions and/or data that may cause or enable the smart tracking computing platform 110 to train, execute, update and/or validate a machine learning model. The machine learning model may be trained using historical data including labeled datasets identifying patterns or sequences or data. For instance, the machine learning model may be trained using historical data related to number of people in a queue, number of items in a queue, time to complete processing, and the like. Accordingly, the machine learning model may receive, as inputs, real-time queue data, purchase item data for the items being purchased, location data of the user (e.g., distance from one or more queues), and the like, and identify an optimal or recommended queue for the user.

Various machine learning algorithms may be used (e.g., by the machine learning engine 112e and/or the one or more machine learning models) without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Smart tracking computing platform 110 may further have, store, and/or include queue data analysis module 112f. Queue data analysis module 112f may store instructions and/or data that may cause or enable the smart tracking computing platform 110 to generate one or more requests for real-time queue data, in conjunction with the machine learning engine 112e, analyze the received real-time queue data to identify a recommended or optimal queue, and the like.

Smart tracking computing platform 110 may further have, store and/or include a database 112g. Database 112g may store data associated with users, historical data associated with previous queue recommendations, and the like.

FIGS. 2A-2J depict one example illustrative event sequence for using smart tracking and queue management functions in accordance with one or more aspects described herein. The events shown in the illustrative event sequence are merely one example sequence and additional events may be added, or events may be omitted, without departing from the invention. Further, one or more processes discussed with respect to FIGS. 2A-2J may be performed in real-time or near real-time.

Figure 2A:
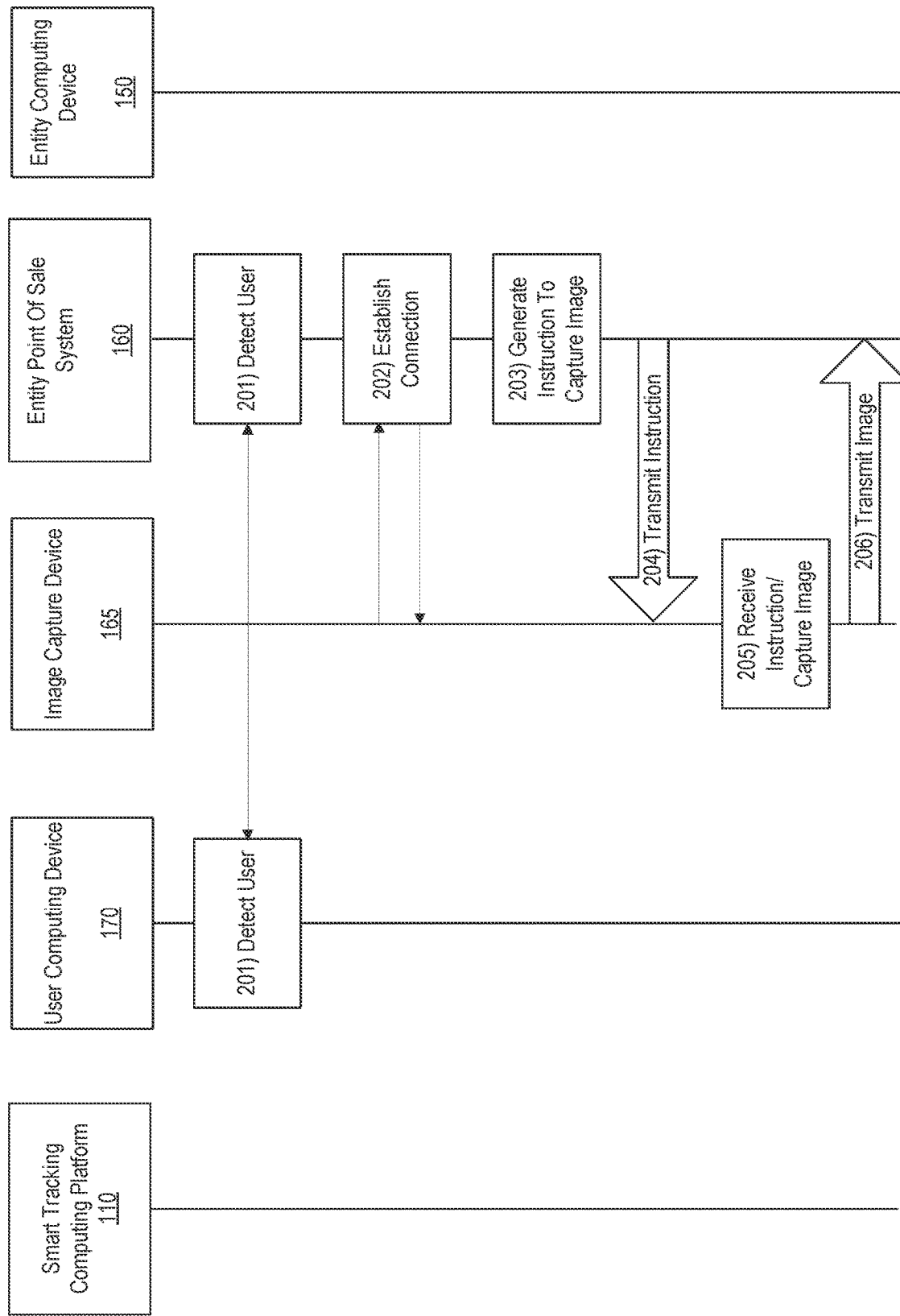

Referring to FIG. 2A, at step 201, a user device may be detected. For instance, user computing device 170 may be detected by an entity point-of-sale (POS) system, such as entity point-of-sale system 160. In some examples, entity POS system 160 may continuously scan for devices within a predefined range (e.g., to identify users who are, entering a location, purchasing items, or the like) and may detect a signal emitted from user computing device 170. In another example, entity POS 160 may emit a signal that may be detected by user computing device 170 which may then cause transmission of a message indicating a presence of user computing device 170 within a predetermined range of the entity POS 160. In some examples, one or more location beacons may be used to transmit and/or detect signals and associated user computing devices.

Although the arrangements discussed herein describe a user device being detected by entity POS system 160, in some examples, the user device may be detected by smart tracking computing platform 110 and/or smart tracking computing platform 110 may be same device or in communication with entity POS system 160, without departing from the invention.

At step 202, a connection may be established between entity POS system 160 and image capture device 165. For instance, a first wireless connection may be established between the entity POS system 160 and image capture device 165. Upon establishing the first wireless connection, a communication session may be initiated between entity POS system 160 and image capture device 165.

At step 203, entity POS system 160 may generate one or more instructions to capture an image. For instance, entity POS system 160 may generate an instruction to capture an image of a user who may be positioned in front of or near the image capture device and/or a point-of-sale system of the merchant, an entry to the location, or the like.

Although the arrangements discussed include instructions generated by and received from the entity POS system 160, smart tracking computing platform 110 may generate and transmit instructions to capture an image without departing from the invention. Additionally or alternatively, smart tracking computing platform 110 and entity POS system 160 may be a same device or in communication.

At step 204, the generated instruction to capture an image may be transmitted by the entity POS system 160 to the image capture device 165. For instance, the instruction to capture the image may be transmitted during the communication session initiated upon establishing the first wireless connection.

At step 205, the image capture device 165 may receive the instruction to capture an image and may execute one or more image capture instructions or commands to capture the image. In some examples, the image capture instructions may include a direction, area, location, or the like, of the user being captured. Accordingly, the image capture device 165 may modify a position (e.g., tilt, rotate, or the like) to capture the desired image.

At step 206, the captured image may be transmitted to the entity POS system 160. For instance, the captured image may be transmitted by the image capture device 165 to the entity POS system 160 during the communication session initiated upon establishing the first wireless connection.

Figure 2B:
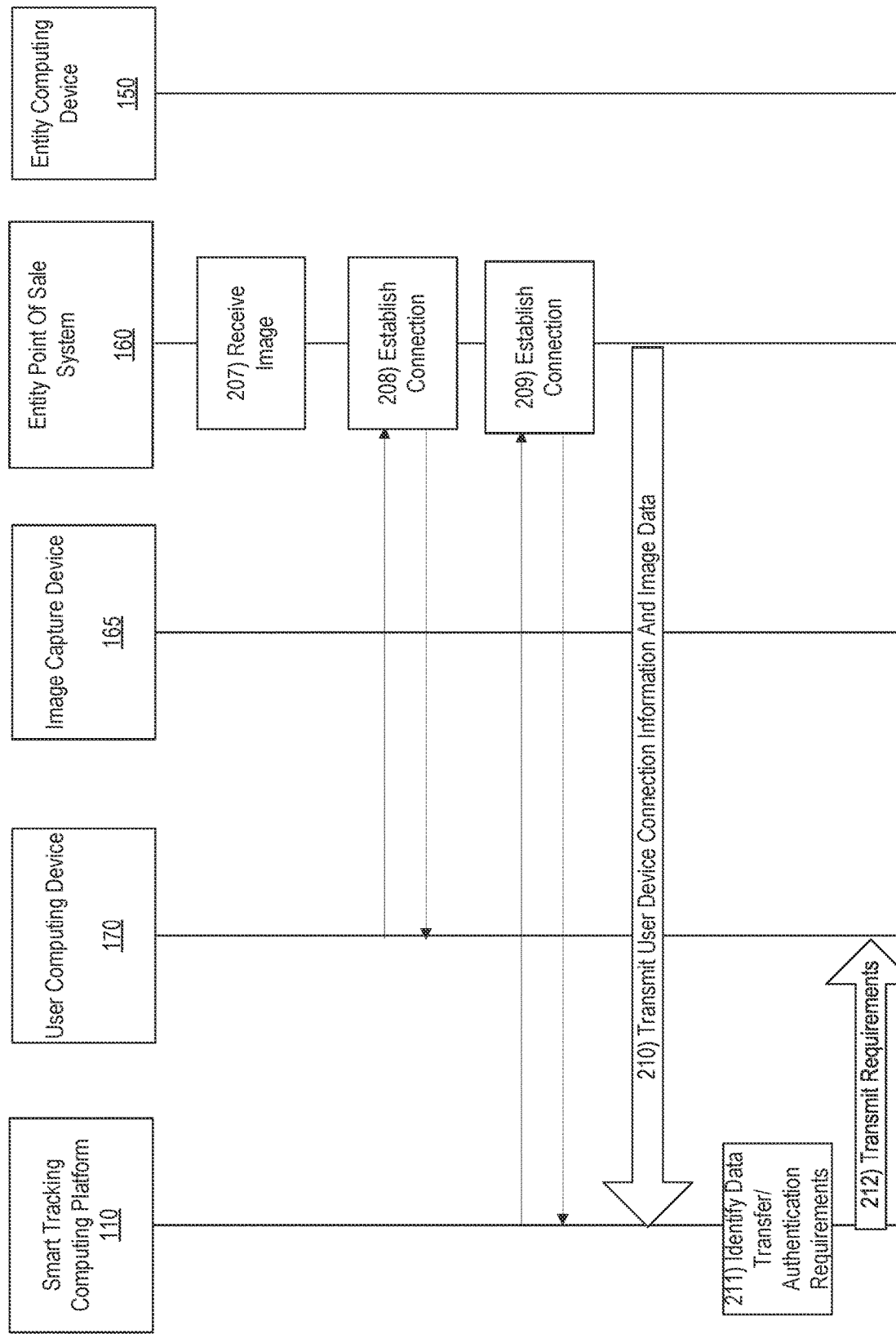

With reference to FIG. 2B, at step 207, the entity POS system 160 may receive the captured image. Responsive to receiving the captured image, the entity POS system 160 may establish a connection with the user computing device 170 at step 208. For instance, a connection may be established between entity POS system 160 and user computing device 170. For instance, a second wireless connection may be established between the entity POS system 160 and user computing device 170. Upon establishing the second wireless connection, a communication session may be initiated between entity POS system 160 and user computing device 170.

The connection established between entity POS system 160 and user computing device may be established via one or more different channels, communication protocols, technologies, or the like. For instance, the connection between the entity POS system 160 and the user computing device 170 may be formed via Bluetooth™, ultra-wideband (UWB), near-field communication, or the like. In some examples, data transmitted via the second wireless connection may be encrypted or otherwise secured or protected to avoid unauthorized actors accessing the data being transferred. In some examples, different types of data may be transferred based on the communication protocol or technology forming the connection between the entity POS system 160 and the user computing device 170. Additionally or alternatively, one or more authentication techniques may be based on the communication protocol or technology forming the connection. The type of connection may be used to identify data transfer protocols, authentication requirements, and the like.

At step 209, a connection may be established between entity POS system 160 and smart tracking computing platform 110. For instance, a third wireless connection may be established between the entity POS system 160 and smart tracking computing platform 110. Upon establishing the third wireless connection, a communication session may be initiated between entity POS system 160 and smart tracking computing platform 110.

At step 210, the received image data and data or information associated with the connection formed between the user computing device 170 and the entity POS system 160 may be transmitted to the smart tracking computing platform 110. For instance, a type of connection (e.g., communication protocol or technology used for the connection) may be transmitted with the image data to the smart tracking computing platform 110.

At step 211, the image data and connection information may be received by the smart tracking computing platform 110 and analyzed to determine authentication requirements, data transmission requirements, and the like. For instance, based on the type of connection, different authentication and/or data transmission requirements may be executed. In some examples, one or more connection types may be more prone to unauthorized activity than others. Accordingly, modifications to authentication requirements and/or data transmission requirements or protocols may be made based on the type of connection. In one example, a first authentication requirement (e.g., username and password) may be required for a first type of connection (e.g., Bluetooth™) while a second, different authentication requirement (e.g., two factor authentication, biometric data, or the like) may be required for a second, different type of connection (e.g., ultra-wideband). Various other examples of modified authentication requirements may be used without departing from the invention.

At step 212, the requirements may be transmitted to the user computing device 170 and, with reference to FIG. 2C, at step 213, the requirements may be transmitted to the entity POS system 160. For instance, the data transmission and/or authentication requirements may be transmitted to both the user computing device 170 (e.g., based on the user computing device being registered with the smart tracking computing platform 110 and identified via the connection information) and the entity POS system 160 for execution.

At step 214, the entity POS system 160 may receive and execute the data transmission requirements and/or authentication requirements. For instance, at step 215, a request for authentication data may be generated. The request for authentication data may be based on the authentication requirements determined based on the connection type and received from the smart tracking computing platform 110.

At step 216, the request for authentication data may be transmitted by the entity POS system 160 to the user computing device 170.

At step 217, the request for authentication data may be received by user computing device 170 and displayed by a display of the device. User authentication response data may be received via the user computing device 170. For instance, the user may provide (e.g., via an interactive user interface displayed by the display of the user computing device 170) user input including the requested authentication data. This user input may be used to generate user authentication response data.

At step 218, the user authentication response data may be transmitted by the user computing device 170 to the entity POS system 160.

Figure 2D:
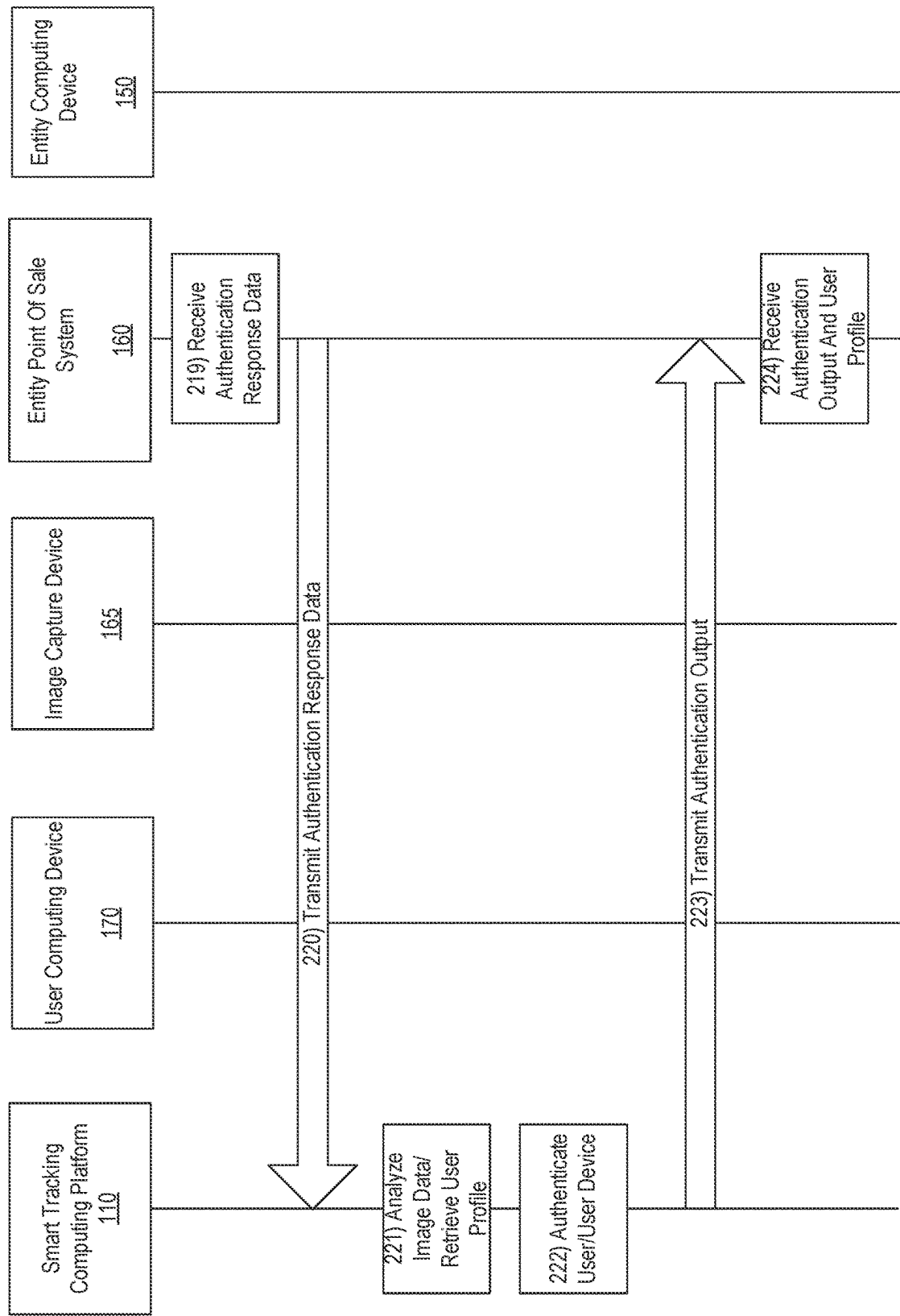

With reference to FIG. 2D, at step 219, the authentication response data may be received by the entity POS system 160 and, in some examples, at step 220, transmitted to the smart tracking computing platform 110 for analysis.

At step 221, the image data may be analyzed using one or more facial recognition techniques. For instance, facial recognition techniques employing various recognition algorithms may be used. For instance, geometric algorithms may be used that evaluate distinguishing features within an image and/or on a person and compare those features to features of pre-stored images. In another example, photo-metric algorithms may be used to associate values with different aspects of an image and compare those values to one or more templates to eliminate variances. Some example algorithms that may be used may include principal component analysis, linear discriminant analysis, elastic bunch graph matching, hidden Markov model, multilinear subspace learning, and/or dynamic link matching. In some examples, three dimensional recognition and/or thermal cameras may be used.

In some examples, analyzing the image data may include comparing the image data to pre-stored image data (e.g., image data of a user captured during, for instance, a registration process). If a match occurs, the user may be identified and a user profile associated with the identified user may be retrieved. In some examples, the user profile data may include identifying information, pre-stored authentication data, user device data, user payment data, and the like.

At step 222, the user may be authenticated by the smart tracking computing platform 110. For instance, the authentication response data may be compared to pre-stored authentication data in the user profile. If the data matches, the user may be authenticated. If the data does not match, additional authentication data may be requested and/or the user may be notified that smart tracking is not available for this trip. In some examples, authenticating the user may include confirming that the authentication response data meets the identified authentication requirements (e.g., based on connection type).

At step 223, the authentication output (e.g., whether the authentication response data matches the pre-stored authentication data) and, if the user is authenticated, the user profile, may be transmitted by the smart tracking computing platform 110 to the entity POS system 160. In some examples, the authentication output may include one or more instructions or commands to cause a connection to be established between devices, such as user computing device 170 and entity computing device 150. At step 224, entity POS system 160 may receive the authentication output and user profile data.

Figure 2E:
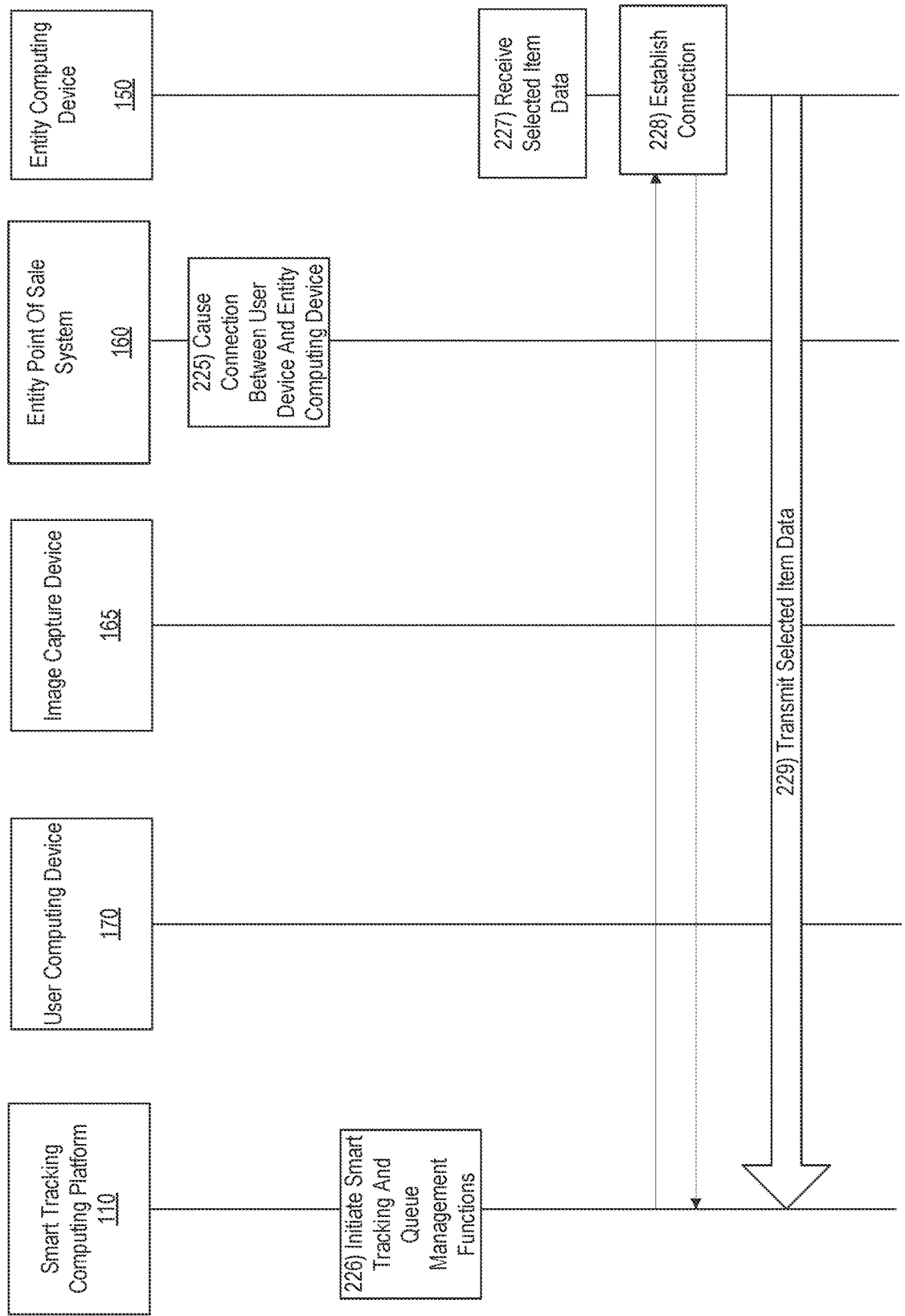

With reference to FIG. 2E, at step 225, the entity POS system 160 may cause a connection to be established between the user computing device 170 and the entity computing device 150 (for example, cause the devices to be paired). For instance, a plurality of entity computing devices 150 may be associated with the entity, entity location, and the like. The plurality of devices may be associated with, linked to or in communication with the entity POS system 160. In some examples, each device of the plurality of entity devices may be associated with a device within the entity, such as a shopping cart. Accordingly, as the user moves through the entity location and retrieves items for purchase, they will be placed in the shopping cart and the associated entity computing device, e.g., entity computing device 150, may capture the item (e.g., image of the item, stock keeping unit (SKU), or the like) and may add it to a list of items being purchased. In some examples, additional details about the item may be retrieved (e.g., from a database storing information about the items) such as weight, size of item or container, or the like.

In some examples, each entity computing device 150, 155 and/or shopping cart associated therewith may have a sensor provisioned with, for example, Bluetooth low energy. The entity computing devices 150, 155 and/or shopping carts may be integrated with the entity POS system 160 in a mesh network using, in some examples, ultra-wideband (UWB) that may enable precise location determination or calculation for optimal queue decisioning.

Accordingly, at step 225, the user computing device 170 may be connected to the entity computing device 150 associated with the shopping cart being used by a user associated with the user computing device 170. In some examples, the connection may be established and data may be transferred according to data transfer protocols established or identified based on the type of connection. For instance, if the connection between the entity POS system 160 and the user computing device 170 was established via a first type of connection (e.g., UWB), the entity computing device 150 may be connected to the user computing device 170 via the same type of connection (e.g., UWB) in order to execute the data transfer protocols, authentication requirements, and the like, associated with that type of connection and executed by the entity POS system 160 and user computing device 170.

At step 226, the smart tracking computing platform 110 may initiate one or more smart tracking and queue management functions (e.g., based on the user computing device 170 connecting to the entity computing device 150). For instance, one or more item tracking, pricing, location tracking, or the like, functions may be initiated, activated, or the like.

At step 227, selected item data may be received or captured by the entity computing device 150. For instance, as the user proceeds to shop, the user may places one or more items in the shopping cart associated with the entity computing device 150. The entity computing device 150 may capture that information.

At step 228, a connection may be established between entity computing device 150 and smart tracking computing platform 110. For instance, a fourth wireless connection may be established between the entity computing device 150 and smart tracking computing platform 110. Upon establishing the fourth wireless connection, a communication session may be initiated between entity computing device 150 and smart tracking computing platform 110.

At step 229, the captured selected item data may be transmitted by the entity computing device 150 to the smart tracking computing platform 110. For instance, the selected item data may be transmitted during the communication session initiated upon establishing the fourth wireless connection.

Figure 2F:
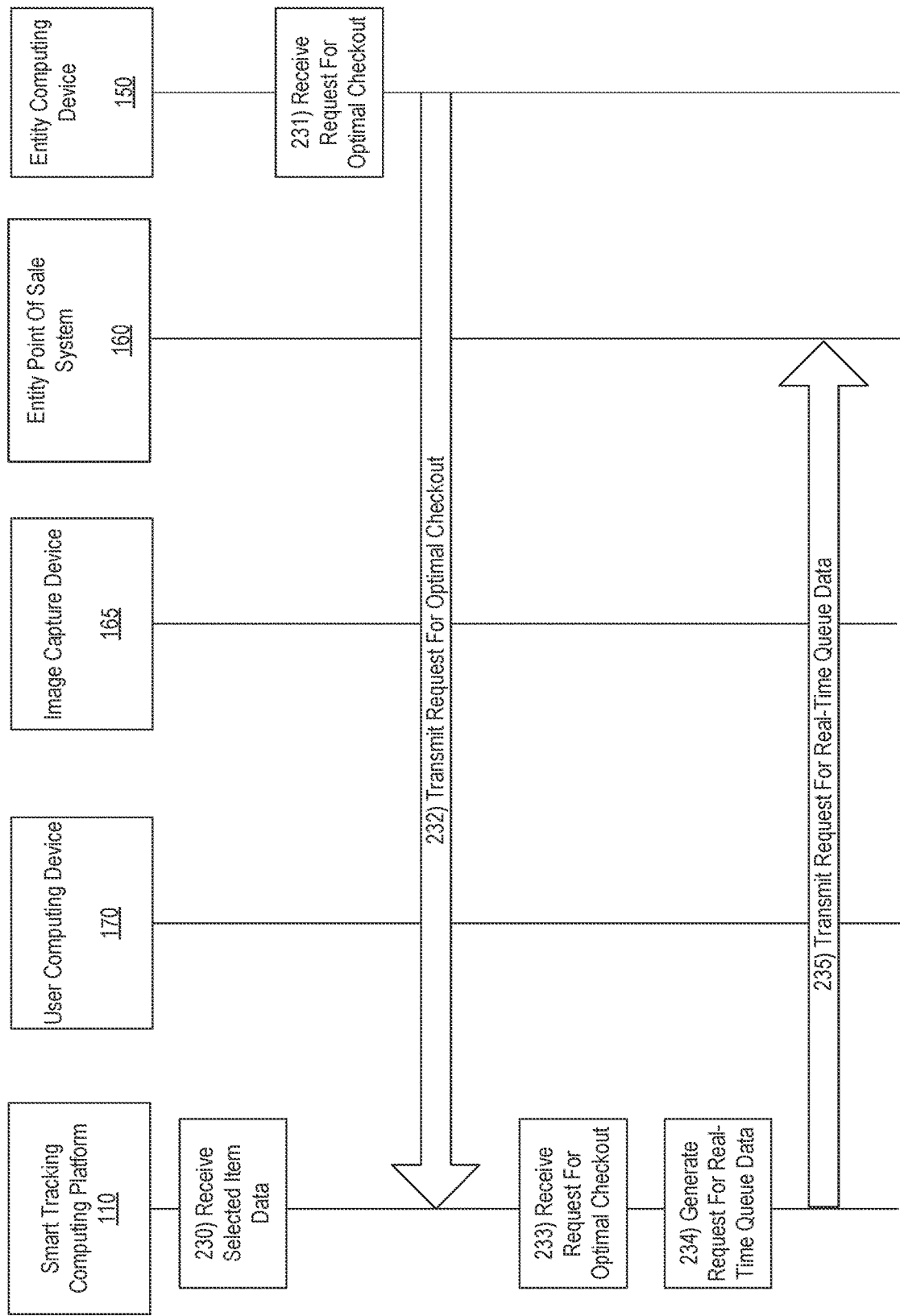

With reference to FIG. 2F, at step 230, the smart tracking computing platform 110 may receive the selected item data.

Figure 5:
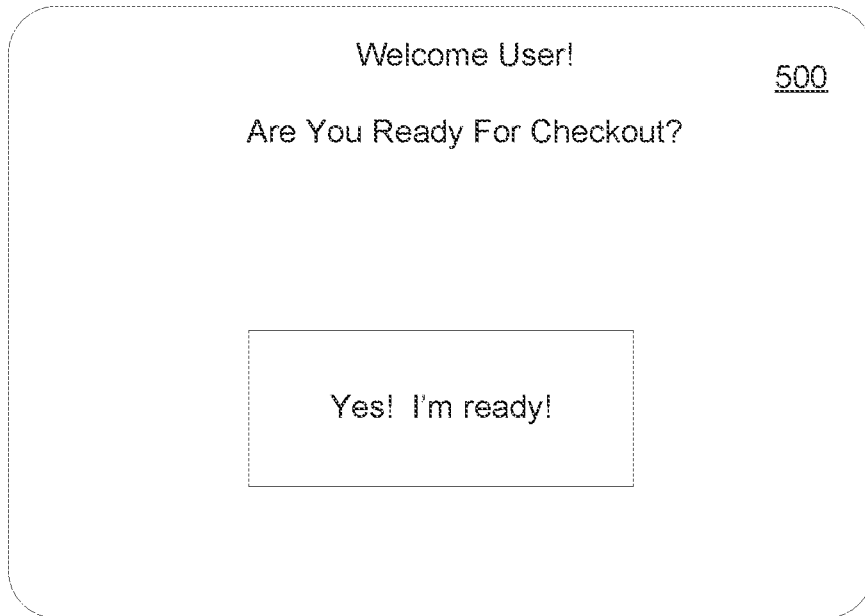
FIGS. 5 and 6 illustrate example user interfaces that may be generated according to open or more aspects described herein.

At step 231, the entity computing device 150 may receive a request for optimal checkout. For instance, the entity computing device 150 may include a display providing a user interface including selectable options for the user. FIG. 5 illustrates one example user interface 500. As shown in FIG. 5, one option may include an option to checkout and identify an optimal checkout queue for the user. Accordingly, when the user has completed the shopping process, they may select an option indicating they are ready to check out and an optimal queue may be identified for the user.

At step 232, the request for optimal checkout may be transmitted by the entity computing device 150 to the smart tracking computing platform 110. For instance, the request for optimal checkout may be transmitted during the communication session initiated upon establishing the fourth wireless connection.

Although arrangements shown including transmitting selected item data separately from the request for optimal checkout, in some examples, the selected item data may be transmitted to the smart tracking computing platform 110 with the request for optimal checkout.

At step 233, the smart tracking computing platform 110 may receive the request for optimal checkout and may initiate optimal checkout functions.

At step 234, a request for real-time queue data may be generated by the smart tracking computing platform 110. For instance, a request for real-time data associated with each queue at the entity location may be generated.

At step 235, the smart tracking computing platform 110 may transmit the request for real-time queue data to the entity POS system 160.

Figure 2G:
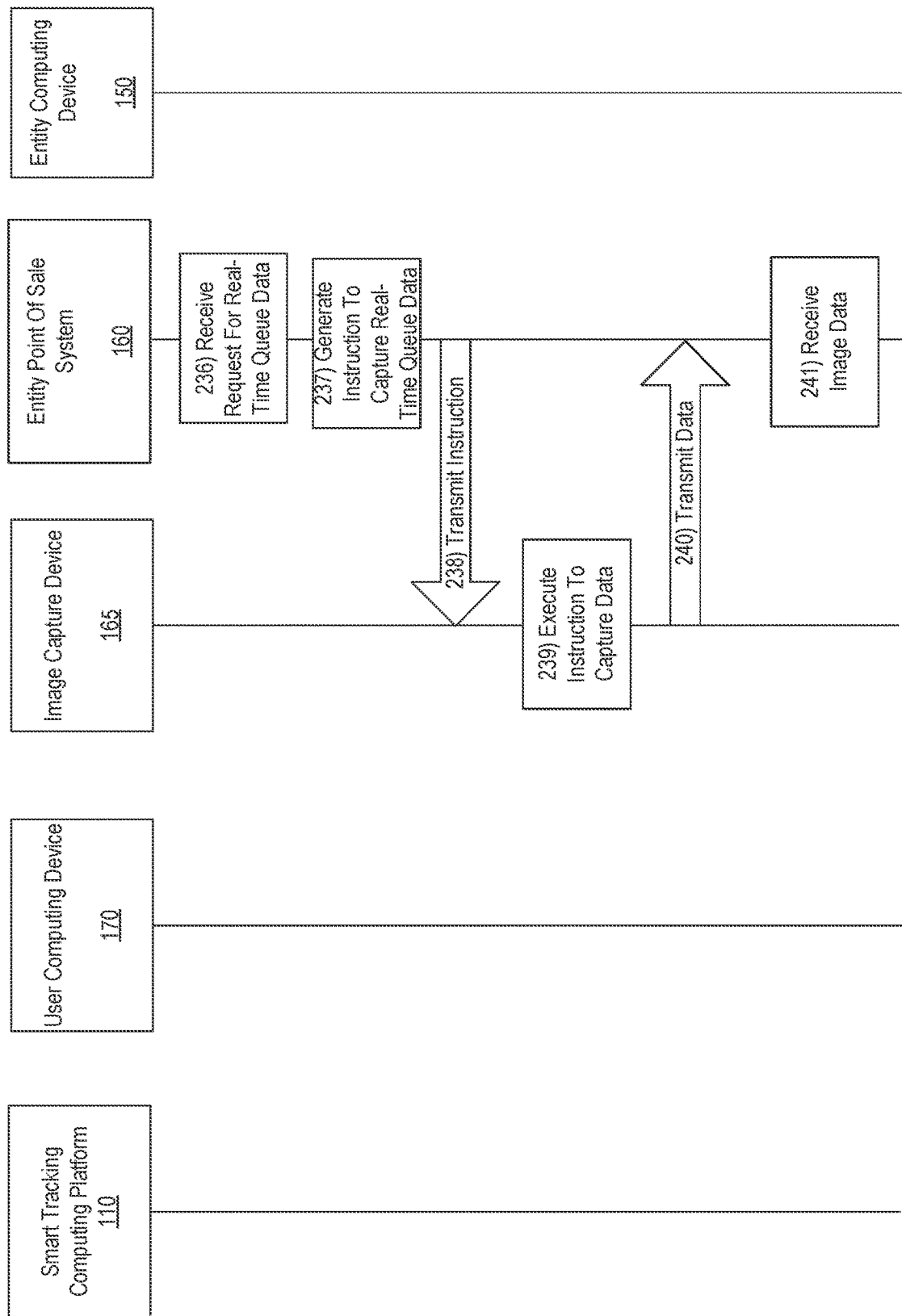

With reference to FIG. 2G, at step 236, the entity POS system 160 may receive the request for real-time queue data and may execute the request.

At step 237, an instruction to capture real-time queue data may be generated by the entity POS system 160. In some examples, the request to capture real-time queue data may include a request to capture image data at various locations throughout the entity location. For instance, if each queue has a camera associated with it, the instruction to capture real-time queue data may include an instruction to capture an image of a current queue. In some examples, the instruction to capture real-time queue data may include an instruction to capture a weight associated with items on a conveyor belt at each queue (e.g., based on a weight sensor associated with the queue). This data may be used to determine a length of time checkout will take for current items. The request for real-time queue data may include requests for other types of data without departing from the invention and the requested data may be based on known availability of different types of data at the entity location (e.g., if cameras are associated with each queue, image data may be requested, or the like).

At step 238, the instruction to capture real-time queue data may be transmitted to one or more image capture devices, such as image capture device 165. Although the instruction is shown as being transmitted to one device, the instruction may be transmitted to a plurality of devices without departing from the invention.

At step 239, the instruction to capture real-time queue data may be received by the image capture device 165 and executed. Accordingly, one or more images of one or more queues may be captured via the image capture device 165.

At step 240, the image capture device 165 may transmit the captured image data to the entity POS system 160. At step 241, the entity POS system 160 may receive the captured image data.

Figure 2H:
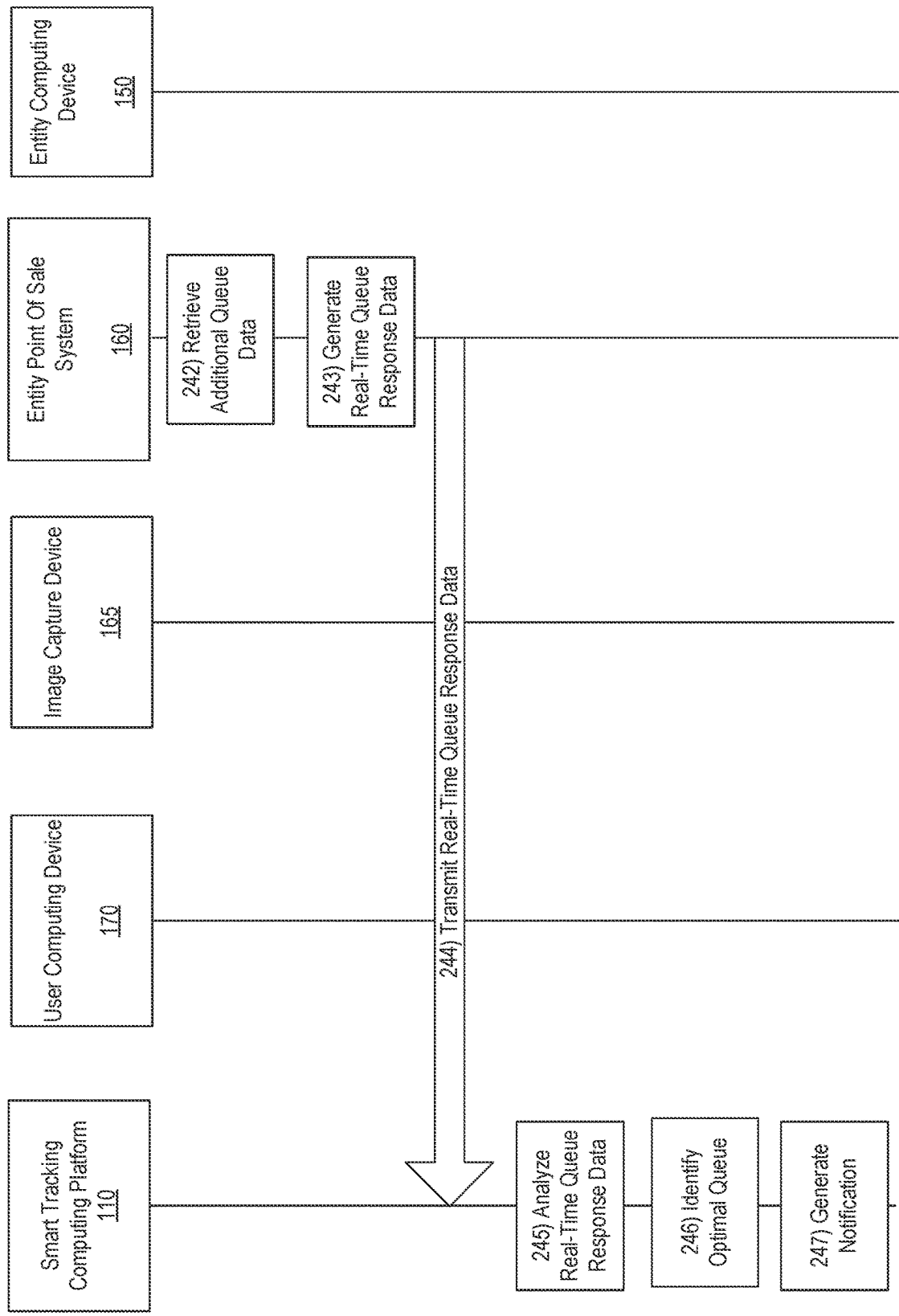

With reference to FIG. 2H, at step 242, the entity POS system 160 may retrieve additional queue data. For instance, weight data associated with items on a conveyor belt may be retrieved for one or more queue, and the like. Additionally or alternatively, a location of the user within the entity (e.g., based on a location of the entity computing device 150 associated with the user) may be retrieved.

At step 243, real-time queue response data may be generated. For instance, the entity POS system 160 may compile the image data and any other retrieved data (e.g., weight data, or the like) and generated real-time queue response data.

At step 244, the entity POS system 160 may transmit the real-time queue response data to the smart tracking computing platform 110.

At step 245, the real-time queue response data may be received and analyzed by the smart tracking computing platform 110. For instance, a machine learning model trained using historical data including labeled datasets associated with patterns or links between a number of customers in a queue, a time to complete checkout, a number of items in a queue, a weight of items in a queue, and the like, may receive the real-time queue response data, as well as selected item data and/or location data of the user, and analyze the data. The machine learning model may then output an optimal queue. In some examples, the optimal queue may include the queue that is likely to be closest to the current location of the user and/or require the least amount of time to complete checkout. In some examples, analyzing the real-time queue response data may include analyzing images captured to identify a number of users currently in one or more queues, a number of items on a conveyor belt for one or more queues, a size or shape of items in one or more queues, or the like.

In some examples, the machine learning model may also use as inputs one or more personalized factors associated with the user. For instance, user profile data may indicate user preferences, user limitations, or the like, that may be used, as desired by the user, in determining the optimal queue.

At step 246, an optimal queue recommendation may be output by the machine learning model.

Figure 6:
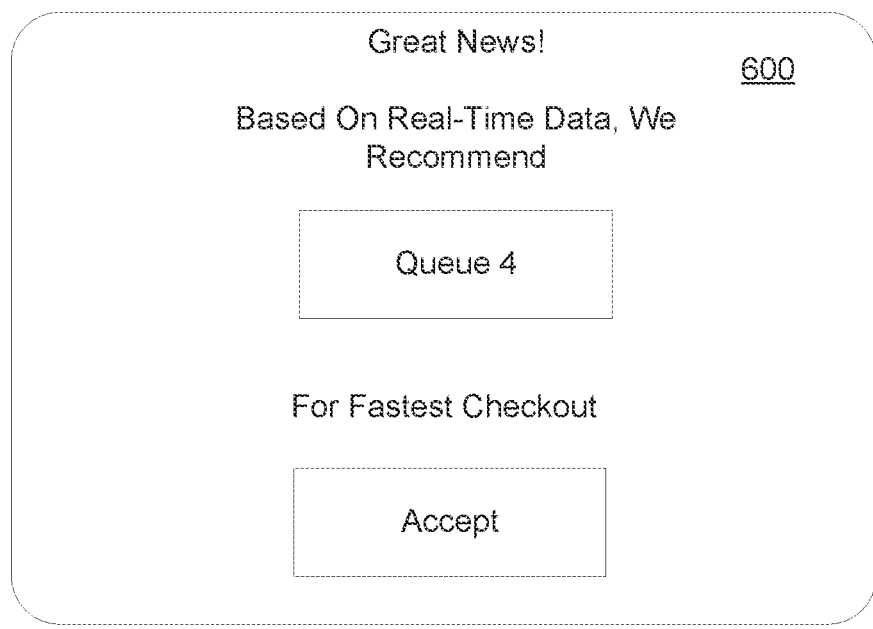

At step 247, a notification may be generated by the smart tracking computing platform 110. For instance, a notification providing a number or other identifier associated with the optimal queue may be generated. FIG. 6 illustrates one example user interface 600 including an identified optimal checkout recommendation. The interface may also include an option for the user to accept the identified optimal queue. This data may then be used to update and/or validate the machine learning model.

Figure 2I:
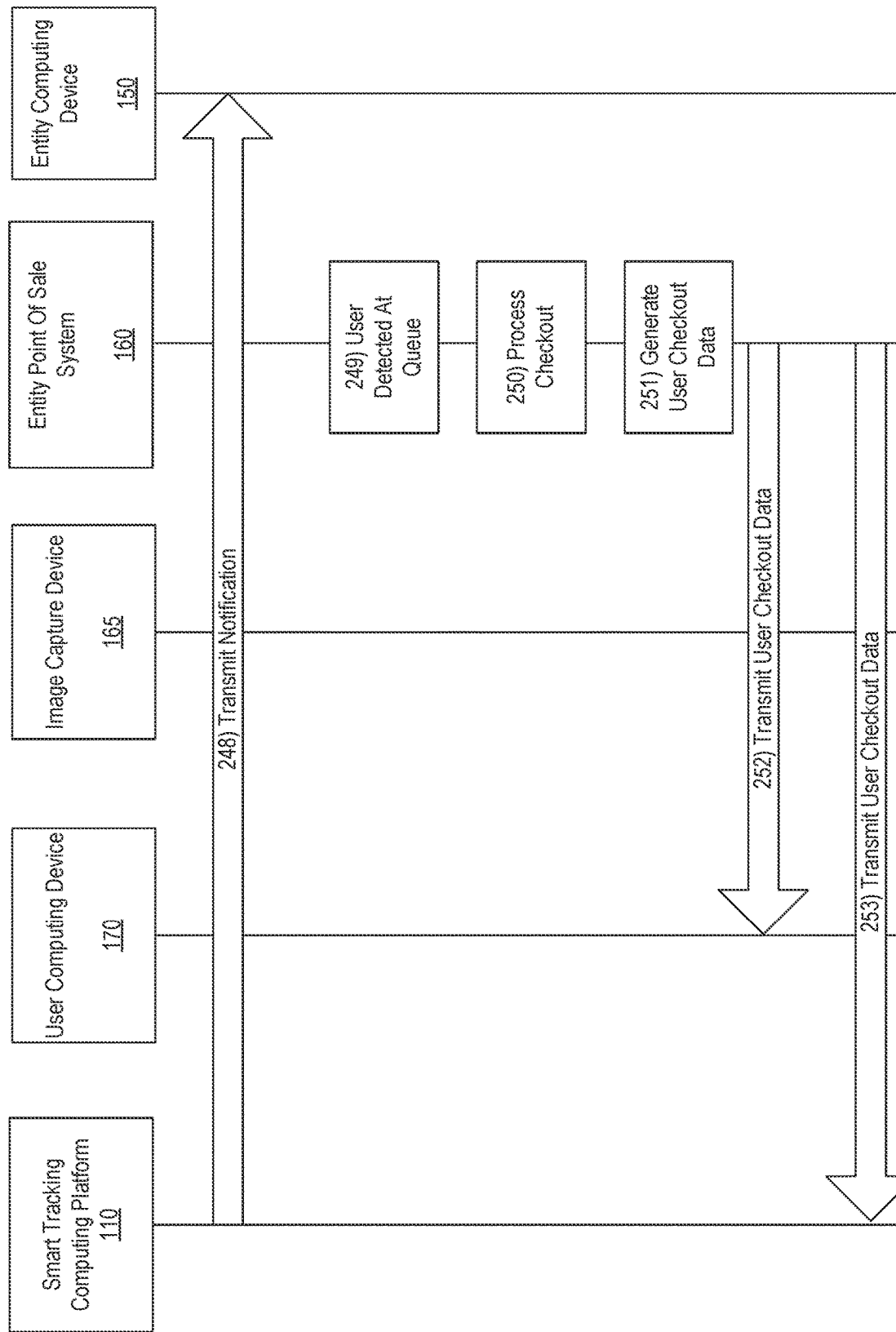

With reference to FIG. 2I, at step 248, the generated notification may be transmitted to the entity computing device 150 and displayed by the entity computing device 150. In some examples, the notification may include selectable options for the user including, for instance, an option to accept the recommendation or request a revised recommendation.

At step 249, the user may be detected at a queue within the entity location. For instance, the user may be detected (e.g., via a location beacon arranged at or near the queue, via image data captured at the queue, via location tracking data obtained from the entity computing device 150 associated with the user, or the like) at the recommended queue (e.g., recommendation was accepted) or at a different queue (e.g., recommendation was not accepted).

At step 250, the checkout for the user may be processed. In some examples, payment for the selected items may be processed automatically (e.g., with limited or no user interaction) based on payment data obtained from the user profile, via a mobile payment application executing on the user computing device 170 that is in communication with the entity POS system 160, or the like. In some examples, a user may be presented with a user interface requesting authorization to pay (e.g., via the user computing device 170, via the entity POS system 160, via the entity computing device 150, or the like). Further, in some arrangements, additional authentication data may be requested and/or provided to process the checkout/payment.

At step 251, user checkout data or information may be generated by the entity POS system 160. For instance, user checkout data including items purchased, number of items purchased, amount of time from joining the queue to checkout completion, or the like, may be generated.

At step 252, the user checkout data may be transmitted by the entity POS system to the user computing device 170. For instance, a record of the transaction including the user checkout data may be transmitted to the user computing device 170 and displayed by a display of the device.

At step 253, the user checkout data may be transmitted by the entity POS system 160 to the smart tracking computing platform 110.

Figure 2J:
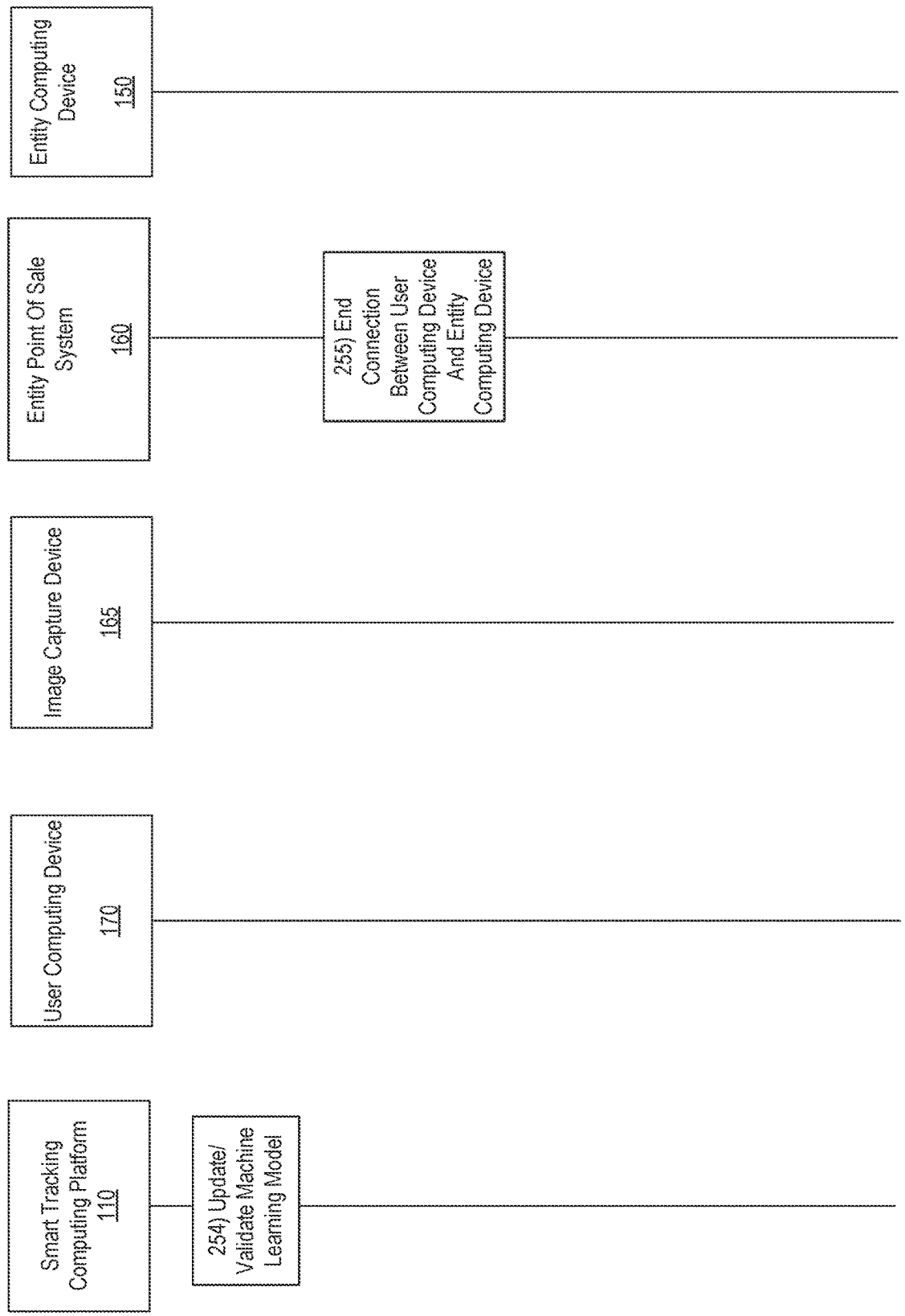

With reference to FIG. 2J, at step 254, the user checkout data may be received by smart tracking computing platform 110 and used to update and/or validate the machine learning model. For instance, information related to whether the queue recommendation was accepted, time from joining queue to completion, number of items, and the like, may be used to update and/or validate the machine learning model. Accordingly, the machine learning model may continuously be updated and accuracy improved.

At step 255, in some examples, after completing the checkout process, the entity POS system (or smart tracking computing platform 110) may end the connection between the user computing device 170 and the entity computing device 150. Accordingly, upon completing the transaction, the two devices might no longer be able to communicate in order to prevent unintended data transmission. Accordingly, the connection or association between the user computing device 170 or user associated therewith and the entity computing device 150 may be temporary (e.g., only for this particular shopping event).

FIG. 3 is a flow chart illustrating one example method of implementing and using facial recognition for smart tracking and queue management in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, registration data may be received from a plurality of users. For instance, smart tracking computing platform 110 may receive registration data from a plurality of users. In some examples, the registration data may include user identifying information, user device identifying information, contact information, payment information (e.g., credit card number, account number, or the like), image data, authentication data, and the like. In some examples, the registration data may be used to generate a user profile for each user.

At step 302, image data may be received. For instance, smart tracking computing platform 110 may receive image data captured by an image capture device 165. The image data may be captured in response to detection of a user device at an entity location.

At step 304, the image data may be analyzed using one or more facial recognition techniques. The image data analysis may be performed to determine whether the user is identifiable from the image data (e.g., whether the user is a registered user).

At step 306, a determination may be made as to whether the user is identifiable. If not, the process may end.

If, at step 306, the user is identifiable (e.g., facial recognition analysis of the image data indicates a registered user), at step 308, user profile data associated with the user may be retrieved. The user profile data may include mobile device information associated with the user, payment information, and the like.

At step 310, one or more smart tracking and/or queue management functions may be initiated. For instance, one or more smart tracking functions that was previously disabled or deactivated may be enabled or activated. In some examples, a user or user device may be linked to a device, such as entity computing device 150, within the entity location, such as a shopping cart having an entity computing device 150 associated therewith. In some examples, a welcome message may be displayed by the entity computing device to indicate to the user that the user is successfully linked to the entity computing device.

At step 312, purchase item data may be received. For instance, as the user traverses the entity location to acquire items for purchase, purchase item data captured via an entity computing device, such as entity computing device 150, may be received by the smart tracking computing platform 110. In some arrangements, as a user places an item in the shopping cart, the item may be scanned and added to a list of items for purchase. That data may be transmitted to the smart tracking computing platform 110 for analysis. Additionally or alternatively, image data may be used to determine a number of items in the user's shopping cart. This data may be transmitted to the smart tracking computing platform 110 for analysis. In some examples, weight sensors on a shopping cart may be used to determine a weight associated with items for purchase and this data may be transmitted to the smart tracking computing platform 110 for analysis.

At step 314, the smart tracking computing platform 110 may receive a request for checkout/optimal queue recommendation or identification. For instance, upon completion of a shopping trip, the user may request generation of an optimal queue for checkout (e.g., via the entity computing device 150, user computing device 170, or the like).

At step 316, real-time queue data may be received. For instance, image data associated with one or more queues, weight data associated with one or more queues, and the like, as well as location information associated with the user, may be received.

At step 318, the real-time queue data may be analyzed, e.g., using a machine learning model, to identify or recommend an optimal queue for checkout. The optimal queue may be based on current user location, number of people identified in each queue, number of items each user has in a queue, and the like.

At step 320, a notification including the identified optimal queue may be generated and transmitted for display on entity computing device 150, user computing device 170, or the like. The user may then proceed to the recommended queue for checkout location data associated with the user may be captured to determine whether the user accepted the recommended queue. This feedback data may be used to further refine the one or more machine learning models used to identify the optimal queue.

Figure 4:
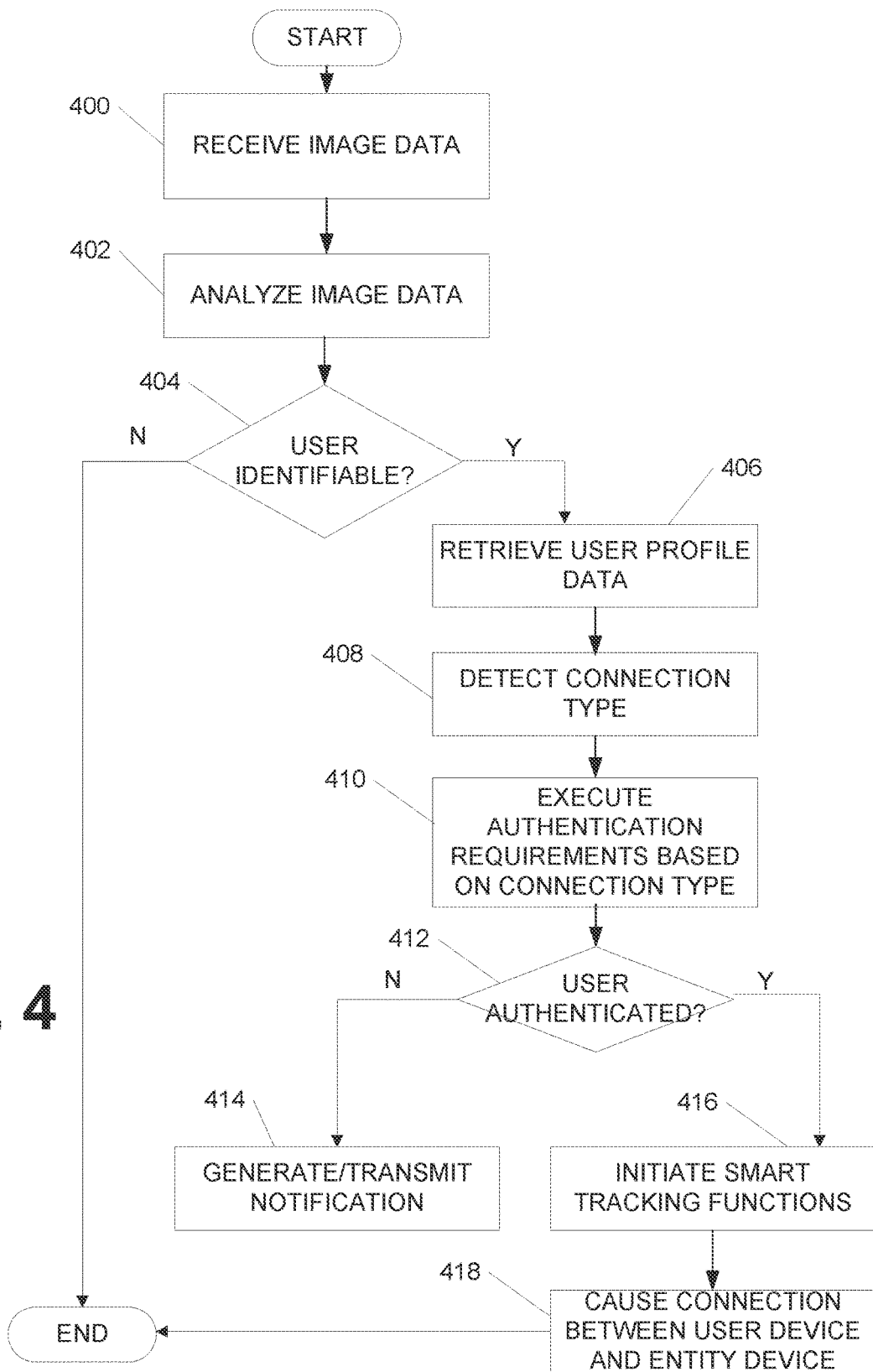
FIG. 4 illustrates an illustrative method for implementing dynamic authentication and smart tracking functions according to one or more aspects described herein.

FIG. 4 is a flow chart illustrating one example method of implementing and using facial recognition for smart tracking and queue management in accordance with one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, a user may be detected and image data may be captured and received by the smart tracking computing platform 110. For instance, upon entering an entity location, a user may be detected (e.g., a signal emitted from the user's mobile device may be detected, a user mobile device may detect a signal from a location beacon, a movement sensor may detect a user, or the like). Upon detecting the user, image data may be captured and transmitted to the smart tracking computing platform 110. The image data may include an image of a face of a user.

At step 402, the image data may be analyzed using facial recognition techniques to determine whether the user is a registered or recognized user.

At step 404, a determination may be made as to whether the user is identifiable (e.g., a registered or recognized user). If the user is not a registered or recognized user, the process may end and the user might not receive smart tracking and optimized queue recommendations.

If, at step 404, the user is identifiable, at step 406, user profile data associated with the user may be retrieved. For instance, user profile data including user identifying information, mobile device information associated with the user, account or payment information for the user, and the like, may be retrieved.

At step 408, a type of connection may be identified and/or received. For instance, a type of connection between the entity POS system 160 and user computing device 170 (e.g., ultrawide band, Bluetooth™, cellular, or the like) or another device (e.g., entity computing device 150, or the like) may be identified. The connection may be established upon the entity POS system detecting the user computing device 170 at the entity location.

At step 410, based on the identified type of connection, one or more authentication requirements may be retrieved and executed. In some examples, the authentication requirements may be customizable by a user and retrieved from the user profile. Additionally or alternatively, the enterprise organization may determine different authentication requirements for different types of connections. Accordingly, a first type of connection may have different authentication requirements than a second type of connection. After retrieving the authentication requirements, a request to authenticate may be transmitted to the user and authentication response data may be received. For instance, if a first connection type is detected, the system may request a personal identification number from the user. If a second connection type is identified, a one-time pas scode transmitted to a pre-registered device may be requested. Various other arrangements for dynamic authentication may be used without departing from the invention.

At step 412, a determination may be made as to whether the user is authenticated. For instance, authentication response data may be compared to pre-stored data (e.g., from the user profile) and, if the data matches and, in at least some examples, the authentication requirements based on the type of connection are met, the user may be authenticated.

If, at step 412, the user is not authenticated, a notification indicating that the authentication data did not match and/or the authentication requirements were not met may be generated and transmitted to, for instance, user computing device 170, entity POS system 160, and the like. In some examples, the notification may request additional authentication data or to proceed without smart tracking functions.

If, at step 412, the user is authenticated, one or more smart tracking functions may be initiated or enabled. For instance, smart tracking for the user may be initiated and an instruction to connect the user to an entity computing device may be generated.

At step 414, the instruction may be transmitted to the user computing device, entity POS system 160, or the like, and may cause a connection to be established between the user computing device 170 and entity computing device 150 which may, for instance, be connected to a shopping cart or other device to collect goods for purchase. The user may then acquire items for purchase and the transaction may be processed. In some examples, the user may complete the purchase transaction with limited or no interaction based on authentication data provided.

Accordingly, aspects described herein enable efficient purchasing of items with limited user interaction. For instance, by relying on facial recognition to identify a user, the system may reduce or eliminate the need for user identifying information to be provided. Further, by modifying authentication requirements based on a communication protocol in use, the system may dynamically identify a most secure method for providing data based on technology in use.

Further, aspects described herein enable efficient queue management and payment processing by using facial recognition to identify a user, retrieve profile data and associated a user with a computing device. The user's items for purchase may be captured and real-time queue data may be used to identify an optimal queue for the user, thereby reducing the likelihood of an inefficient checkout experience.

Figure 7:
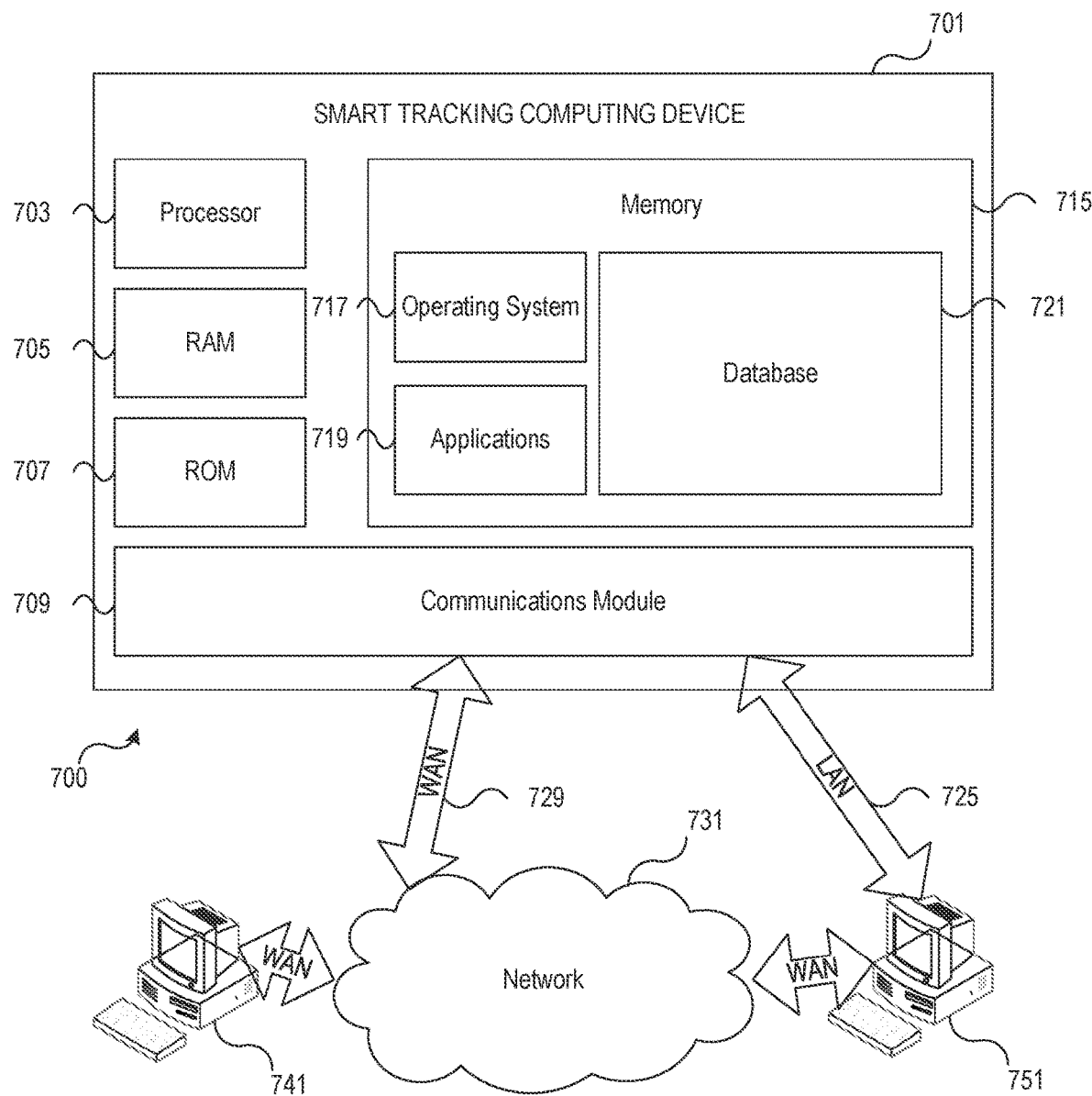
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include smart tracking computing device 701 having processor 703 for controlling overall operation of smart tracking computing device 701 and its associated components, including Random Access Memory (RAM) 705, Read-Only Memory (ROM) 707, communications module 709, and memory 715. Smart tracking computing device 701 may include a variety of computer readable media. Computer readable media may be any available media that may be accessed by smart tracking computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by smart tracking computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on smart tracking computing device 701. Such a processor may execute computer-executable instructions stored on a computer-readable medium.

Software may be stored within memory 715 and/or storage to provide instructions to processor 703 for enabling smart tracking computing device 701 to perform various functions as discussed herein. For example, memory 715 may store software used by smart tracking computing device 701, such as operating system 717, application programs 719, and associated database 721. Also, some or all of the computer executable instructions for smart tracking computing device 701 may be embodied in hardware or firmware. Although not shown, RAM 705 may include one or more applications representing the application data stored in RAM 705 while smart tracking computing device 701 is on and corresponding software applications (e.g., software tasks) are running on smart tracking computing device 701.

Communications module 709 may include a microphone, keypad, touch screen, and/or stylus through which a user of smart tracking computing device 701 may provide input, and may also include one or more of a speaker for providing audio output and a video display device for providing textual, audiovisual and/or graphical output. Computing system environment 700 may also include optical scanners (not shown).

Smart tracking computing device 701 may operate in a networked environment supporting connections to one or more remote computing devices, such as computing devices 741 and 751. Computing devices 741 and 751 may be personal computing devices or servers that include any or all of the elements described above relative to smart tracking computing device 701.

The network connections depicted in FIG. 7 may include Local Area Network (LAN) 725 and Wide Area Network (WAN) 729, as well as other networks. When used in a LAN networking environment, smart tracking computing device 701 may be connected to LAN 725 through a network interface or adapter in communications module 709. When used in a WAN networking environment, smart tracking computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   detect, based on continuous scanning by a point-of-sale system for signals emitted from computing devices within a predefined range of the point-of-sale system, a user computing device of a user;
   transmit, to an image capture device and based on the detected user computing device of the user, an instruction to capture an image of a user present at a location of an entity;

receive, from the image capture device and based on execution of the instruction to capture the image, the image of the user present at the location of the entity;

analyze, using facial recognition technologies, the image of the user present at the location of the entity;

retrieve, based on the analysis of the image using the facial recognition technologies, user profile data;

based on the retrieved user profile data, initiate smart tracking and queue management operations;

receive, from the user computing device of the user, items selected for purchase;

receive, from the user computing device, user input requesting an optimal checkout queue;

receive, from a plurality of checkout queues, real-time queue data;

analyze the real-time queue data in real-time to identify an optimal queue for the user, wherein the optimal queue for the user is identified based, at least in part, on the items selected for purchase;

generate a user interface instructing the user to proceed to the identified optimal queue;

transmit the user interface for display on the computing device; and cause the user interface to display on the user computing device.

2. The computing platform of claim 1, wherein the user computing device of the user is a computing device of the entity that is temporarily associated with the user.

3. The computing platform of claim 1, wherein the real-time queue data includes image data from the plurality of checkout queues.

4. The computing platform of claim 1, wherein analyzing the real-time queue data is performed by executing a machine learning model.

5. The computing platform of claim 4, further including instructions that, when executed, cause the computing platform to:

receive user checkout information including whether the user accepted the instruction to proceed to the identified optimal queue; and validate the machine learning model based on the user checkout information.

6. The computing platform of claim 5, wherein the user checkout information including whether the user accepted the instruction to proceed to the identified optimal queue is based, at least in part, on current location data within the entity location of the user computing device of the user.

7. The computing platform of claim 1, wherein the optimal queue for the user is identified further based on a distance between the user and the plurality of checkout queues and a number of users currently in each checkout queue of the plurality of checkout queues.

8. A method, comprising:

detecting, by a computing platform, the computing platform having at least one processor and memory and based on continuous scanning by a point-of-sale system for signals emitted from computing devices within a predefined range of the point-of-sale system, a user computing device of a user;

transmitting, by the at least one processor and to an image capture device and based on the detected user computing device of the user, an instruction to capture an image of a user present at a location of an entity;

receiving, by the at least one processor, and from the image capture device, the image of the user present at the location of the entity;

analyzing, by the at least one processor and using facial recognition techniques, the image of the user present at the location of the entity;

retrieving, by the at least one processor and based on the analysis of the image using the facial recognition techniques, user profile data;

based on the retrieved user profile data, initiating, by the at least one processor, smart tracking and queue management operations;

receiving, by the at least one processor and from the user computing device of the user, items selected for purchase;

receiving, by the at least one processor and from the user computing device, user input requesting an optimal checkout queue;

receiving, by the at least one processor and from a plurality of checkout queues, real-time queue data;

analyzing, by the at least one processor, the real-time queue data in real-time to identify an optimal queue for the user, wherein the optimal queue for the user is identified based, at least in part, on the items selected for purchase;

generating, by the at least one processor, a user interface instructing the user to proceed to the identified optimal queue;

transmitting, by the at least one processor, the user interface for display on the user computing device; and causing, by the at least one processor, the user interface to display on the computing device.

9. The method of claim 8, wherein the user computing device of the user is a computing device of the entity that is temporarily associated with the user.

10. The method of claim 8, wherein the real-time queue data includes image data from the plurality of checkout queues.

11. The method of claim 8, wherein analyzing the real-time queue data is performed by executing a machine learning model.

12. The method of claim 11, further including:

receiving, by the at least one processor, user checkout information including whether the user accepted the instruction to proceed to the identified optimal queue; and validating, by the at least one processor, the machine learning model based on the user checkout information.

13. The method of claim 12, wherein the user checkout information including whether the user accepted the instruction to proceed to the identified optimal queue is based, at least in part, on current location data within the entity location of the user computing device of the user.

14. The method of claim 8, wherein the optimal queue for the user is identified further based on a distance between the user and the plurality of checkout queues and a number of users currently in each checkout queue of the plurality of checkout queues.

15. One or more non-transitory computer-readable media storing instructions that, when executed by a computing platform comprising at least one processor, memory, and a communication interface, cause the computing platform to:

detect, based on continuous scanning by a point-of-sale system for signals emitted from computing devices within a predefined range of the point-of-sale system, a user computing device of a user;

transmit, to an image capture device and based on the detected user computing device of the user, an instruction to capture an image of a user present at a location of an entity;

receive, from the image capture device, the image of the user present at the location of the entity;

analyze, using facial recognition technologies, the image of the user present at the location of the entity;

retrieve, based on the analysis of the image using the facial recognition technologies, user profile data;

based on the retrieved user profile data, initiate smart tracking and queue management operations;

receive, from the user computing device of the user, items selected for purchase;

receive, from the user computing device, user input requesting an optimal checkout queue;

receive, from a plurality of checkout queues, real-time queue data;

analyze the real-time queue data in real-time to identify an optimal queue for the user, wherein the optimal queue for the user is identified based, at least in part, on the items selected for purchase;

generate a user interface instructing the user to proceed to the identified optimal queue;

transmit the user interface for display on the user computing device; and cause the user interface to display on the user computing device.

16. The one or more non-transitory computer-readable media of claim 15, wherein the user computing device of the user is a computing device of the entity that is temporarily associated with the user.

17. The one or more non-transitory computer-readable media of claim 15, wherein the real-time queue data includes image data from the plurality of checkout queues.

18. The one or more non-transitory computer-readable media of claim 15, wherein analyzing the real-time queue data is performed by executing a machine learning model.

19. The one or more non-transitory computer-readable media of claim 18, further including instructions that, when executed, cause the computing platform to:

receive user checkout information including whether the user accepted the instruction to proceed to the identified optimal queue; and validating the machine learning model based on the user checkout information.

20. The one or more non-transitory computer-readable media of claim 19, wherein the user checkout information including whether the user accepted the instruction to proceed to the identified optimal queue is based, at least in part, on current location data within the entity location of the user computing device of the user.

21. The one or more non-transitory computer-readable media of claim 15, wherein the optimal queue for the user is identified further based on a distance between the user and the plurality of checkout queues and a number of users currently in each checkout queue of the plurality of checkout queues.

* * * * *